(12) United States Patent
Turnbull et al.

(10) Patent No.: US 12,111,556 B2
(45) Date of Patent: Oct. 8, 2024

(54) MULTI-SEGMENT ELECTRO-OPTIC APPARATUS AND CONTROL METHODS

(71) Applicant: Gentex Corporation, Zeeland, MI (US)

(72) Inventors: Robert R. Turnbull, Holland, MI (US); David A. Blaker, Holland, MI (US); Xiaoxu Niu, Grand Rapids, MI (US); Leroy J. Kloeppner, Jenison, MI (US); Bradley R. Hamlin, Allendale, MI (US); Michael J. Burns, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/131,599

(22) Filed: Apr. 6, 2023

(65) Prior Publication Data
US 2023/0324758 A1 Oct. 12, 2023

Related U.S. Application Data

(60) Provisional application No. 63/328,001, filed on Apr. 6, 2022.

(51) Int. Cl.
*G02F 1/166* (2019.01)
*G02F 1/00* (2006.01)
*G02F 1/1676* (2019.01)

(52) U.S. Cl.
CPC ............ *G02F 1/166* (2019.01); *G02F 1/0018* (2013.01); *G02F 1/1676* (2019.01)

(58) Field of Classification Search
CPC ........................................................ G02F 1/166
See application file for complete search history.

(56) References Cited

U.S. PATENT DOCUMENTS

| | | | |
|---|---|---|---|
| 5,805,330 A | 9/1998 | Byker et al. |
| 5,940,201 A | 8/1999 | Ash et al. |
| 6,137,620 A | 10/2000 | Guarr et al. |
| 6,239,898 B1 | 5/2001 | Byker et al. |
| 6,407,847 B1 | 6/2002 | Poll et al. |
| 6,433,914 B1 | 8/2002 | Lomprey et al. |
| 6,567,708 B1 | 5/2003 | Bechtel et al. |
| 6,597,489 B1 | 7/2003 | Guarr et al. |
| 7,085,609 B2 | 8/2006 | Bechtel et al. |
| 7,672,611 B2 | 3/2010 | Nakaya |

(Continued)

FOREIGN PATENT DOCUMENTS

| | | |
|---|---|---|
| JP | 2006018167 A | 1/2006 |
| JP | 2014119639 A | 6/2014 |
| KR | 20200145965 A | 12/2020 |

*Primary Examiner* — Chun-Nan Lin
(74) *Attorney, Agent, or Firm* — Price Heneveld LLP; Brian James Brewer

(57) ABSTRACT

An electro-optic device includes a first electrode electrically connecting with power supply circuitry. A second electrode is spaced from the first electrode and electrically connecting with the power supply circuitry. An electro-optic medium is disposed between the first electrode and the second electrode. At least one third electrode is disposed between the first electrode and the second electrode and electrically connecting with one of the first electrode and the second electrode via switching circuitry. The switching circuitry is operable to control an electrical current through the first electrode, the electro-optic medium, and the second electrode.

20 Claims, 15 Drawing Sheets

(56) References Cited

U.S. PATENT DOCUMENTS

| | | |
|---|---|---|
| 8,547,624 B2 | 10/2013 | Ash et al. |
| 2016/0329871 A1* | 11/2016 | Xu ........................ G02F 1/0327 |
| 2020/0283151 A1* | 9/2020 | Key ........................ B64D 13/08 |
| 2021/0157165 A1 | 5/2021 | Shi et al. |
| 2021/0267684 A1* | 9/2021 | Du ........................ H01S 3/1643 |
| 2021/0302798 A1* | 9/2021 | Niu ..................... G02F 1/13306 |
| 2022/0035217 A1 | 2/2022 | Kim et al. |

\* cited by examiner

# MULTI-SEGMENT ELECTRO-OPTIC APPARATUS AND CONTROL METHODS

CROSS-REFERENCE TO RELATED APPLICATIONS

This application claims priority under 35 U.S.C. § 119(e) and the benefit of U.S. Provisional Application No. 63/328,001 entitled ELECTRO-OPTIC DEVICE HAVING CONTROLLED ELECTRO-OPTIC SEGMENTS, filed on Apr. 6, 2022, by Robert R. Turnbull, et al., the entire disclosure of which is incorporated herein by reference.

TECHNOLOGICAL FIELD

The present disclosure relates generally to electro-optic devices and, more particularly, relates to an electro-optic device having individually-controlled electro-optic segments.

SUMMARY OF THE INVENTION

In one aspect of the invention, an electro-optic device includes a first electrode electrically connecting with power supply circuitry. A second electrode is spaced from the first electrode and electrically connecting with the power supply circuitry. An electro-optic medium is disposed between the first electrode and the second electrode. At least one third electrode is disposed between the first electrode and the second electrode and electrically connecting with one of the first electrode and the second electrode via switching circuitry. The switching circuitry is operable to control an electrical current through the first electrode, the electro-optic medium, and the second electrode.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1A:
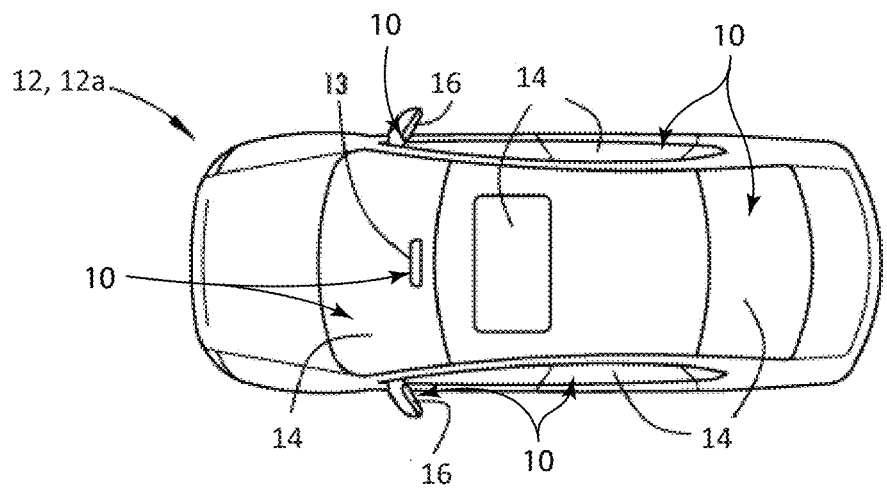
FIG. 1A is a perspective view of an automobile that incorporates an electro-optic device of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "substantially," when used in reference to electrical properties, optical properties (such as light transmissivity), and the like, may, in some embodiments, mean within ten percent of a target state (e.g., 100%). In other embodiments, "substantially" may mean within five percent of the ideal state. In further embodiments, "substantially" may mean within three percent of the ideal state. In yet other embodiments, "substantially" may mean within one percent of the ideal state. By way of example, "opaque" have an ideal state of approximately 0% light transmissivity, while "transparent" may have an ideal state of approximately 100% light transmissivity.

The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the top, or front, portion of a window assembly and that is proximal to the observer or user of the assembly and ending with a surface that corresponds to the bottom, or back, portion of an assembly and that is distal to the user. Accordingly, the term "behind" refers to a position, in space, following something else and suggests that one element or thing is at the back of another as viewed from the front of the window assembly. Similarly, the term "in front of" refers to a forward place or position, with respect to a particular element as viewed from the front of the assembly.

According to some aspects of the present disclosure, an electro-optic device having improved responsiveness is disclosed. For example, the electro-optic device may include an electro-optic element divided into a plurality of electro-optic segments that may be controlled individually. The individualized control may prevent and/or limit the electro-optic device from producing an irising effect (i.e., darkening of a perimeter of the electro-optic device before darkening of a center of the electro-optic device). Further, the electro-optic device of the present disclosure may provide for a cost-effective construction by reducing the depth of the conductive material applied to the substrates of the electro-optic element. In addition, the electro-optic device may provide for a reduced bulbar footprint on the electrodes of the electro-optic element. These reductions may, in general, be due to fine control over electrical qualities (e.g., voltage, current) applied to the electro-optic device.

The electro-optic device may also provide for a single-sided power connection to the electro-optic element due to the individualized control. More specifically, because power may be provided to individual electro-optic segments of the electro-optic device, a high voltage (e.g., 6-10 v) may be provided to the electro-optic device without damaging components of the electro-optic device. The high voltage may be any voltage operable to power one segment of the electro-optic device (e.g., 0.7V to 1.2V) and/or may be any voltage operable to power a plurality of electro-optic segments (e.g., greater than approximately 1V). The high voltage may not be limited to a particular range of voltages. The voltage ranges described herein are intended to be exemplary and non-limiting. For example, the high voltage may be a minimum threshold voltage for powering the electro-optic segments to limit power consumption of the electro-optic device. In some arrangements, the supply voltage is dynamic and/or adjustable via manual or programmed control. Optionally, a ground or negative supply rail may be provided to improve clearing performance, or to allow the drive voltage to be reduced for local areas. The high voltage may be stepped down for each electro-optic segment. The high voltage may also mitigate the issue of voltage drops that occur due to inherent resistance of the conductive material that may be employed in the electro-optic device. Further, the electro-optic device of the present disclosure may provide for faster and more uniform darkening and clearing of the electro-optic cell(s) by providing an array of the individually controlled electro-optic segments.

Figure 1B:
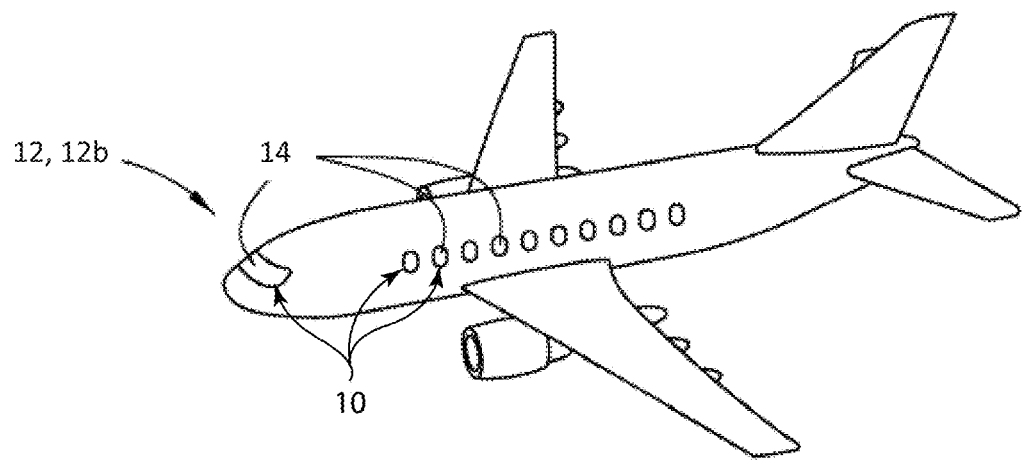
FIG. 1B is a perspective view of an airplane that incorporates an electro-optic device of the present disclosure.
Figure 1C:
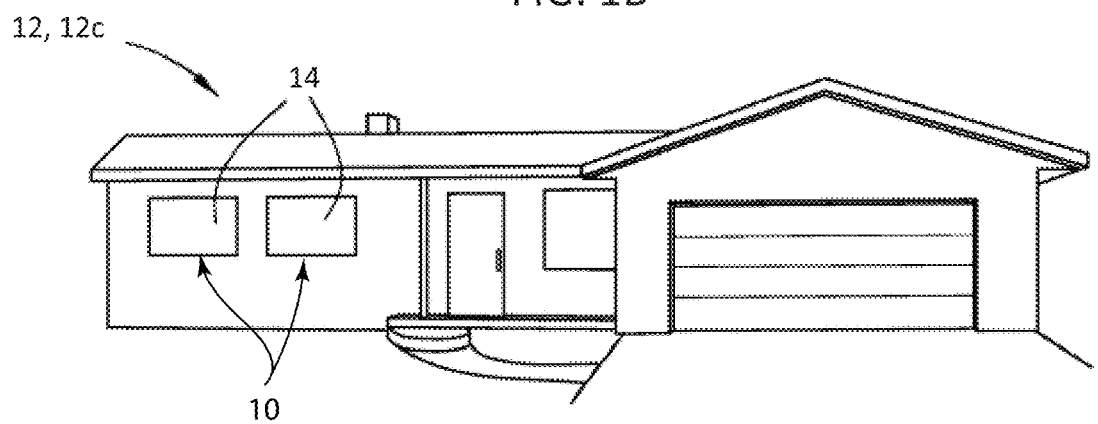
FIG. 1C is a perspective view of a building that incorporates an electro-optic device of the present disclosure.

Referring to FIGS. 1A-C, various embodiments of an electro-optic device 10 are incorporated with one or more structures 12. For example, FIG. 1A illustrates an automobile 12a employing one or more electro-optic devices 10 in the form of an interior rearview mirror 13, a window 14, and/or an exterior rearview mirror 16. FIG. 1B illustrates an airplane 12b employing one or more electro-optic devices 10 in the form of the window 14. FIG. 1C illustrates a building 12c employing one or more electro-optic devices 10 in the form of the window 14.

The window 14 may be configured to provide a physical barrier between two areas and be operable to allow the variable transmission of light between the two areas. The window 14 may come in many configurations, such as a building window, a vehicle windshield, a side vehicle window, a rear vehicle window, a sunroof window, or the like.

The exterior rearview mirror 16 may be coupled to an automobile 12a exterior configured to provide a viewer with a field of view capturing a rear or side of the automobile 12a. The interior rearview mirror 13 may be a device in an automobile interior configured to provide a viewer with a field of view comprising a rearward exterior of automobile 12a. The interior and exterior rearview mirrors 13, 16 may be variably transmissive to minimize glare.

Figure 2:
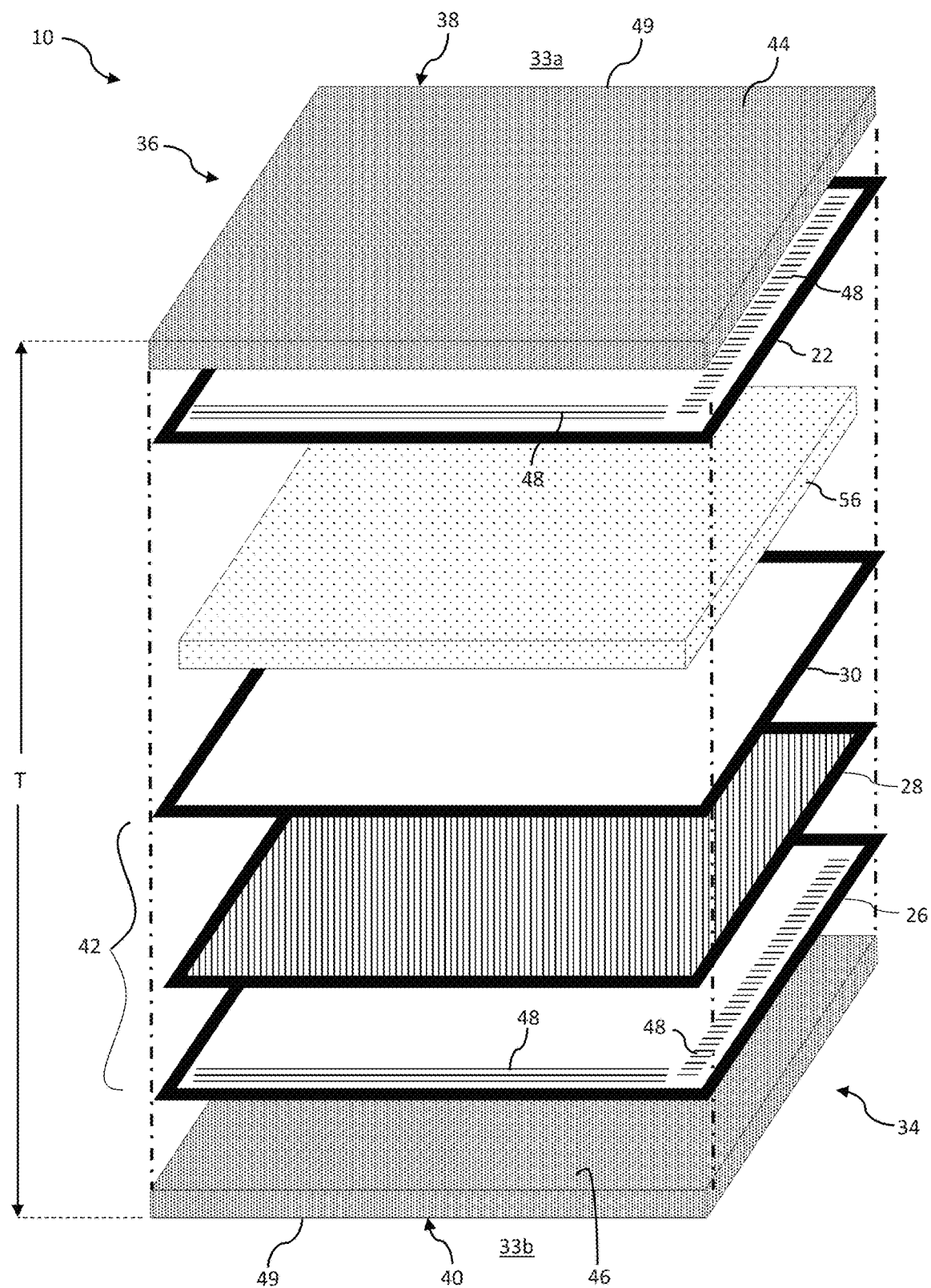
FIG. 2 is an exploded view of an electro-optic device of the present disclosure.
Figure 3:
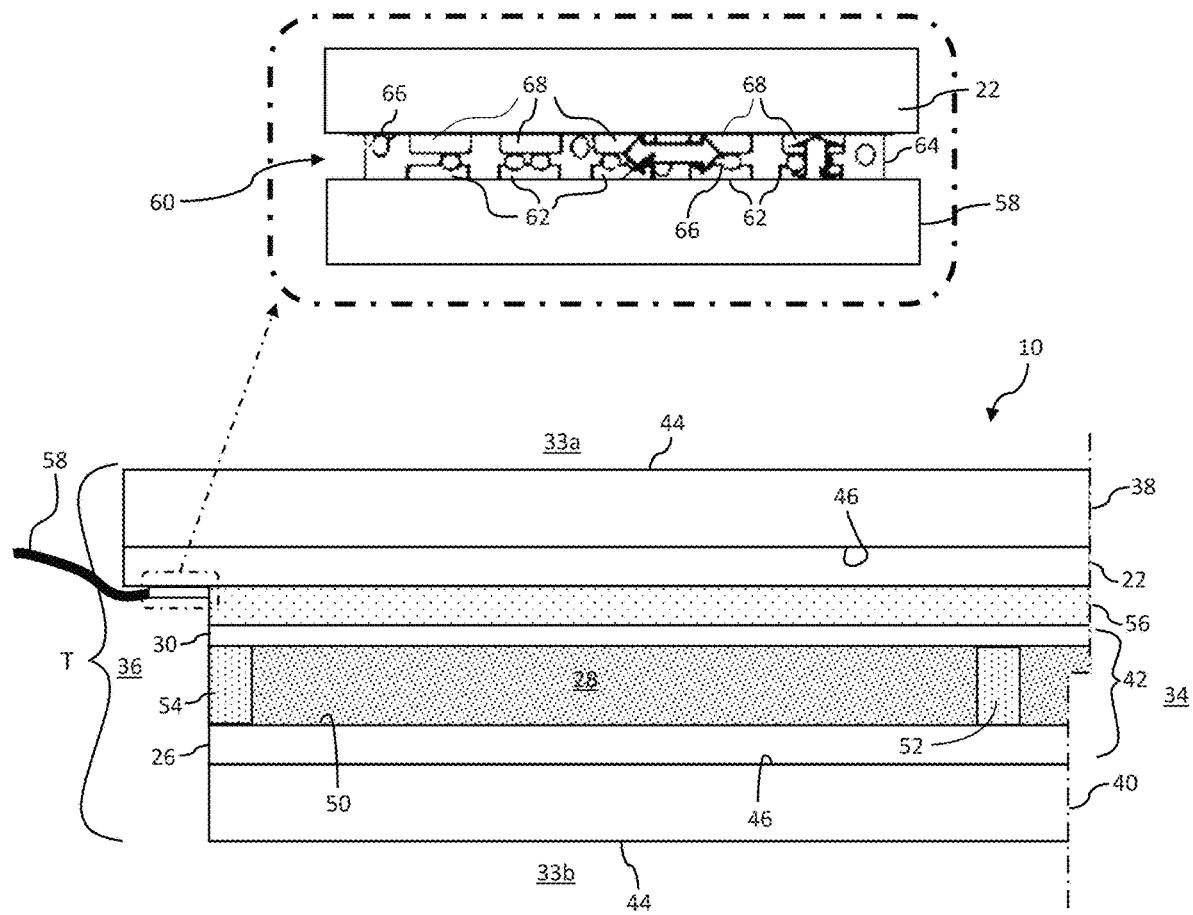
FIG. 3 is a cross-sectional view of the electro-optic device of FIG. 2.
Figure 4:
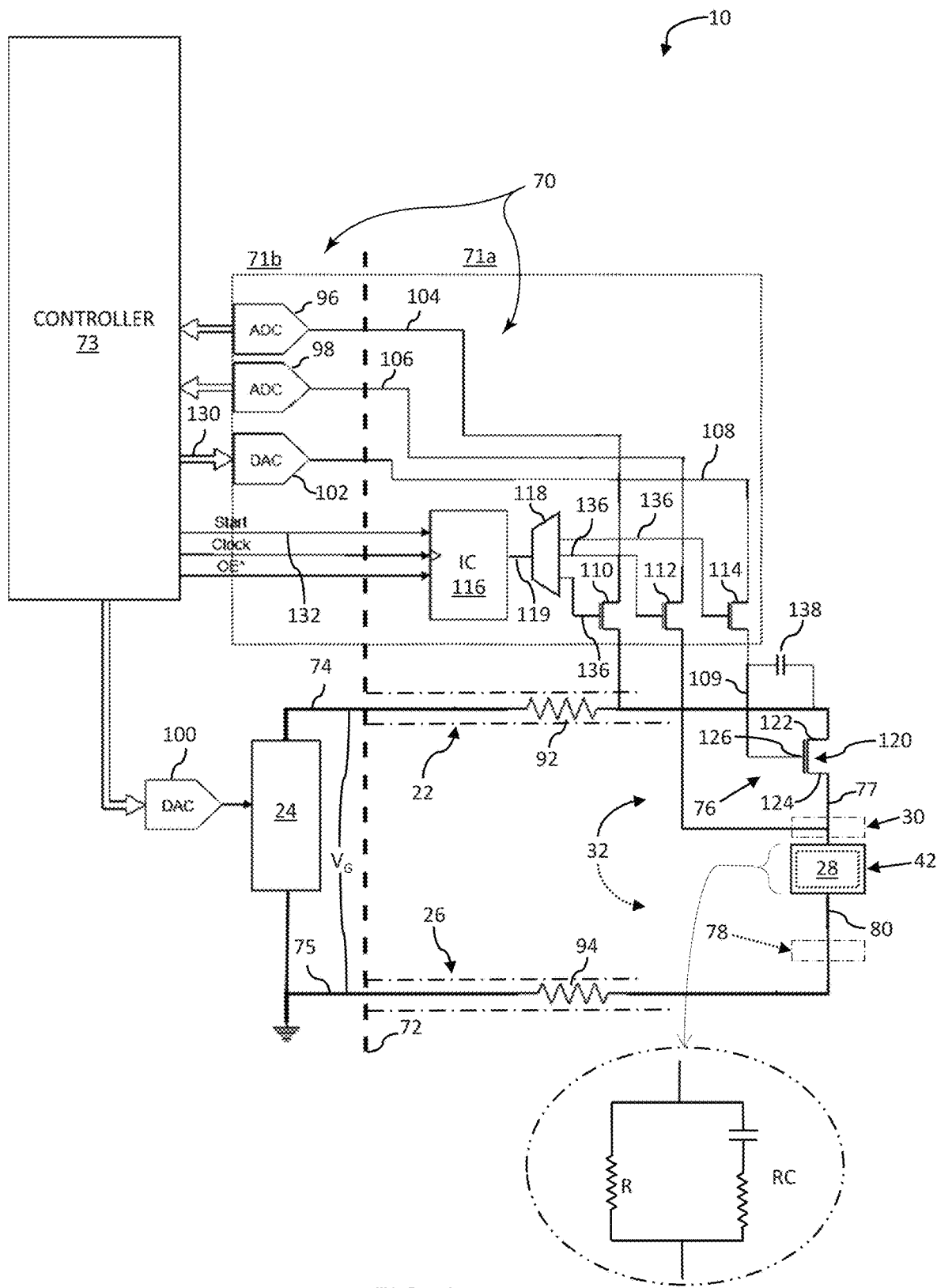
FIG. 4 is a schematic view of the electro-optic device of FIG. 2 in electrical communication with control circuitry.

Referring to FIGS. 2-4, an electro-optic device 10 incorporating electrical switching and control components is provided. With respect to the physical construction of the electro-optic device 10, a first electrode 22 electrically connects with a power supply circuitry 24. A second electrode 26 may be spaced from the first electrode 22 and electrically connecting with the power supply circuitry 24. An electro-optic medium 28 may be disposed between the first electrode 22 and the second electrode 26. At least one third electrode 30 (e.g., an intermediate electrode 30) may be disposed between the first electrode 22 and the second electrode 26. As shown in FIG. 2, the intermediate electrode 30 may electrically connect with one of the first electrode 22 and/or the second electrode 26 via switching circuitry 32. The switching circuitry 32 may be operable to control an electrical current through the first electrode 22, the electro-optic medium 28, and the second electrode 26. The intermediate electrode 30 may be disposed toward a first portion 33a (e.g., a top portion) of the electro-optic device 10. The electro-optic device 10 may lack an intermediate electrode 30 disposed toward a second portion 33b (e.g., a bottom portion) of the electro-optic device 10. In such a configuration, the first portion 33a may be referred to as an "active plate" due to the individual control and/or monitoring of electrical parameters of the first portion 33a, and the second portion 33b may be referred to as a "passive plate" due to the lack of individual control and/or monitoring of the electrical parameters of the second portion 33b.

The electro-optic device 10 may extend between a first end 34, along a length L of the electro-optic device 10, to a second end 36 opposite the first end 34. The electro-optic device 10 may also have a thickness T that extends between a first substrate 38 and a second substrate 40 of the electro-optic device 10. An electro-optic element 42 may be disposed between the first substrate 38 and the second substrate 40 of the electro-optic device 10. The electro-optic element 42 may generally be formed from the second electrode 26, the electro-optic medium 28, and the intermediate electrode 30. The term electro-optic element may be used herein to primarily refer to an electrical characterization of the physical structures illustrated and is not intended to be limited to any specific portion of the electrodes 22, 26, 30 or the electro-optic medium 28. It is further contemplated that one or more of the electro-optic elements 42 may include or otherwise be referred to as an electrochromic cell.

Each of the first substrate 38 and the second substrate 40 may extend between an outer surface 44 and an inner surface 46. The electro-optic element 42 may be sandwiched between the inner surfaces 46 of the first substrate 38 and the second substrate 40. An electrical connector 48 (e.g., busbar), may be provided at one or both ends 34, 36 of the electro-optic device 10 to provide a power connection to the electro-optic device 10. The electrical connector 48 may also, or alternatively, be positioned alongside edges 49 of the electro-optic device 10 on the first electrode 22 and the second electrode 26.

Referring more particularly to FIG. 3, the intermediate electrode 30 and the second electrode 26 define a cavity 50 extending therebetween for receiving the electro-optic medium 28. The electro-optic medium 28 may be an electro-optic fluid of a substantially transparent material that is electrically conductive. According to at least one example, the electro-optic medium 28 is an electrochromic medium which includes at least one solvent, at least one anodic material, and at least one cathodic material. Typically, both of the anodic and cathodic materials are electroactive and at least one is electrochromic. The first and second electrodes 22, 26 may be surface-mounted to the inner surfaces 46 of the first and second substrates 38, 40, and further may be solid, as opposed to gelatinous. The intermediate electrode 30 may have a similar composition (indium tin oxide (ITO)) with lesser thickness than either or both of the first and second electrodes 22, 26. Though ITO is identified in this example, various transparent, electrically conductive materials may be employed. The electro-optic medium 28 may include an electrochromic substance that may alter in color when an electrical potential and/or an electric current is applied across the electro-optic medium 28. By employing selectively transparent materials in various components of the electro-optic device 10, the electro-optic device 10 may be selectively darkening (e.g., controlling the transmissivity of light) depending on the electrical parameters applied to the electrodes 22, 26, 30.

With continued reference to FIG. 3, the cavity 50 may be sealed via one or more barriers 52, 54 disposed between the third electrode 30 and the second electrode 26. The barriers may include intermediate barriers 52 interposing multiple cavities 50, as well as end barriers 54. The end barriers 54 may be disposed along a periphery of the electro-optic device 10 to prevent the electro-optic medium 28 from escaping the cavity 50 and/or to prevent the electro-optic medium 28 from being exposed to atmospheric conditions. The intermediate barriers 54 may physically and/or electrically isolate portions of the electro-optic medium 28 into multiple cavities 50. In this way, the intermediate barriers 52 may separate the electro-optic device 10 into a plurality of electro-optic elements 42, which may be controlled independently/individually. In addition to providing improved control, the barriers 52, 54 may provide stability to the electro-optic device 10. The barriers 52, 54 may be formed of an epoxy resin and may be electrically nonconductive.

Referring to FIGS. 2 and 3, the switching circuitry 32 may be positioned in a switching layer 56 interposing the intermediate electrode 30 and one or both of the first electrode 22 and the second electrode 26. As depicted, the switching layer 56 may be sandwiched between the first electrode 22 and the intermediate electrode 30. Effectively, the switching layer 56 may control whether or not, and how much, electrical power is supplied to the intermediate electrode 30 by adjustment of the switching circuitry 32. The switching layer 56 may have a similar shape and continuity as the backplane electrodes (e.g., the first electrode 22 and the second electrode 26), though the particular shape and distribution of the switching layer 56 is not limited to this shape. For example, the switching layer 56 may be web-shaped or may be formed only along the side edges 49 or middle portions of the electro-optic element 42.

Referring to FIG. 3, a flexible circuit 58 may be provided to carry electrical signals between the electro-optic components and off-board circuitry. The flexible circuit 58 may be in electrical communication with the electro-optic device 10 via a conductive connection 60 having a plurality of conductors 62 electrically isolated from one another. The conductive connection 60 may include anisotropic conductive film (ACF) having an epoxy acrylic adhesive 64 and electrically conductive beads 66 suspended in the adhesive 64, which may be non-conductive. The beads 66 may provide electrical communication between the plurality of conductors 62 and one or more conductive traces 68 in the electro-optic device 10. For example, the electro-optic device 10 may include conductive traces 68 disposed on or embedded in the first or second electrodes 22, 26, the switching layer 56, or another portion of the electro-optic device 10. In a more specific example, one conductive trace 68 may be disposed on the electrode(s) 22, 26, 30 for providing a global voltage VG to the first or second electrodes 22, 26 (e.g., ITO backplanes), and other conductive traces 68 may be formed within the switching layer 56 for connecting with the switching circuitry 32. In this way, the flexible circuit 58 may allow electrical properties of the electro-optic device 10 to be controlled at a location spaced from the electro-optic components.

Referring now to FIG. 4, the electro-optic device 10 is schematically illustrated with control circuitry 70 in electrical communication with the electro-optic element 42. For purposes of clarity, the electro-optic device 10 may be referred to as having a visible portion 71a (e.g., the "glass") and a concealed portion 71b (e.g., features spaced from the window assembly, or features disposed on the window assembly but concealed along a periphery of the window assembly). A dividing line 72 demonstrates one possible configuration of the position of the visible portion 71a relative to a position of the concealed portion 71b. The left side of the dividing line 72, as illustrated, may represent the concealed portion 71b, and the right side of the dividing line 72 may represent the visible portion 71a. The specific position of the various components of the electro-optic device 10 may depend on sizes, shapes, and/or level of light opacity of each component. For example, components with transparent, translucent, or transflective properties may be disposed with the window assembly, whereas large and/or substantially opaque components may be positioned in the concealed portion 71b. In this way, the electro-optic device 10 provided may be substantially transparent while still being electrically controlled via external components.

The control circuitry 70 generally achieves control of the electro-optic element 42 by controlling the power supply circuitry 24 and/or the switching circuitry 32. More specifically, the control circuitry 70 may include a controller 73 that receives voltage or current signals corresponding to voltages or currents associated with the electrodes 22, 26, 30. The controller 73 may output control signals to the switching circuitry 32 and/or the power supply circuitry 24 to adjust a voltage or current applied to the electro-optic element 42. The control signals may be generated based on the voltage and current signals according to programmed instructions stored in the controller 73. For example, if a voltage between the intermediate electrode 30 and the second electrode 26 (i.e., the voltage across the electro-optic element 42) is less than a target voltage across the electro-optic element 42, the controller 73 may control the switching circuitry 32 to provide a greater voltage to the intermediate electrode 30. In this way, the voltage across the electro-optic element 42 may be increased to the target voltage. In examples described further herein, the controller 73 may control the switching circuitry 32 to provide a greater or lesser voltage to the second electrode 26 (see, at least, FIG. 7).

As schematically represented in FIG. 4, the electro-optic element 42 may have a first electrical approximation of a resistor R in parallel with a resistor-capacitor (RC) series circuit. Though approximated as shown in FIG. 4, the electro-optic element 42 may also have a second electrical approximation of a current source in parallel with three parallel RC circuits. The second electrical approximation may be an accurate model when the electro-optic element 42 is an electrochromic cell (EC cell). For example, the EC cell may store more charge than a parallel plate capacitor. The electrical approximation of the electro-optic element 42 may depend on specific qualities of the materials employed in the electro-optic medium 28 (e.g., the electro-optic fluid), as well as the quality and/or type of materials utilized in construction of the electrodes 22, 26, 30. Further, the electrical properties of the electro-optic element 42 may be transitory (e.g., dependent on the transmittance state or temperature of the electro-optic element 42). Additional factors that affect the operation of the device 10 may include the age of the electro-optic device 10 or environmental conditions (e.g., temperature differential between an interior and an exterior of the vehicle). At least one temperature sensor may be provided with the electro-optic device 10 for monitoring the temperature of the electro-optic device 10. As will be described in further detail, the at least one temperature sensor may include a plurality of temperature sensors disposed in the electro-optic device 10 and/or about a perimeter of the electro-optic device 10. The at least one temperature sensor may include a band-gap voltage reference circuit or other circuitry operable to detect a temperature or temperature change associated with the electro-optic device 10.

Referring still to FIG. 4, the electro-optic element 42 may be in communication with the power supply circuitry 24 via a first node 74 and a second node 75. The power supply circuitry 24 may be operable to apply the global voltage VG across the first node 74 and the second node 75. The power supply circuitry 24 may generate an electrical current to flow from the power supply circuitry 24 when a load (e.g., the electro-optic element 42) is in communication with both the first node 74 and the second node 75. To better control the current flow to/from the electro-optic element 42, the switching circuitry 32 may include a first switching circuit 76 that electrically interposes the first node 74 and a third node 77 electrically connected with the intermediate electrode 30. In this way, the switching circuitry 32 may selectively allow electrical current to flow between the first node 74 and the third node 77. In some examples described further herein, the switching circuitry 32 may also include a second switching circuit 78 that electrically connects a fourth node 80 that is electrically connected with the second electrode 26 to the power supply circuitry 24. As exemplarily illustrated in FIG. 4, the second switching circuit 78 may be omitted and electrical current through and/or voltage across the electro-optic element 42 may be controlled by the first switching circuit 76. This configuration may generally correspond to the "passive plate" arrangement previously described.

In the exemplary aspects illustrated, at least one first resistor 92 is shown in electrical series connection with the first node 74 and at least one second resistor 94 is shown in electrical series connection with the second node 75. Each resistor 92, 94 serves as an electrical approximation of the inherent resistive properties of the first and second electrodes 22, 26, respectively. It is generally contemplated that, as the distance from the power supply circuitry 24 increases, the inherent resistance of the electrodes 22, 26 increases. This may result in a corresponding voltage drop across the length L or width of the electro-optic device 10. For example, the ITO may have a resistance of 1 ohm per square millimeter. Accordingly, the control circuitry 70 may monitor and control the electrical parameters of the electrodes (e.g., the first and second electrodes 22, 26), or areas near the electrodes, to maximize uniformity of the electro-optic device 10.

Because the controller 73 may be a digital-signal controller, the control circuitry 70 may include at least one converter module 96, 98, 100, 102 for converting an electrical signal from one form to another form. For example, the controller 73 may be operable to output and receive digital signals, whereas the switching circuitry 32 and/or some portions of the control circuitry 70 may operate in response to analog signals (e.g., an electrical potential) and/or output analog signals. The converter modules 96, 98, 100, 102 may include a digital-to-analog converter (DAC) and an analog-to-digital converter (ADC). The ADC may be employed for monitoring various electrical parameters associated with the electro-optic device 10. For example, a first ADC 96 may be operable to receive a voltage measured via a first feedback node 104 in electrical communication with the first electrode 22. A second ADC 98 may be operable to receive a voltage measured via a second feedback node 106 in electrical communication with the intermediate electrode 30. A first DAC 100 may be employed to control the power supply circuitry 24, which may include one or more direct-current power supplies. It is generally contemplated that any other type of power supply may be employed to generate power for the electro-optic element 42, such as a current driving circuit, a voltage-driving circuit, etc. A second DAC 102 may be employed for controlling the switching circuitry 32 via first and second driving nodes 108, 109. The power supply circuitry 24 may be configured to set to a voltage lower than an element voltage (e.g., the voltage across the electro-optic element 42), for example, 0V or a negative voltage, to discharge the electro-optic element 42 and optically clear it. In this way, current flow through the electro-optic element 42 can be reversed, and charge may be removed from the electro-optic element 42.

The control circuitry 70 may include a plurality of control transistors 110, 112, 114 in electrical communication with the controller 73 via an integrated circuit (IC 116). A multiplexer 118 may interpose the controller 73 and the control transistors 110, 112, 114. Alternatively, the multiplexer 118 may be omitted and a select signal may be communicated directly to each of the control transistors 110, 112, 114 via one or more select nodes 119. In the illustrated example, the IC 116 may operate as a DAC by processing one or more digital signals provided from the controller 73 to generate the select signal, which may be an analog signal, and communicate the select signal to the multiplexer 118 via a select node 119. The select signal may be controlled via a shift register that allows sequential selection of each output at a high frequency. The multiplexer 118 may be operable to output a control signal to one of the plurality of control transistors 110, 112, 114 via at least one control node 136 based on the select signal provided by the integrated circuit 116.

Regarding specific aspects of the IC 116 of the present disclosure, the integrated circuit 116 may be a gate-driving circuit. The IC 116 may be a source driver IC 116 (e.g., Novatek NT39411) to directly control a driving transistor 120 instead of the second DAC 102. As described in further detail in reference to FIGS. 8-13, the source driver IC 116 may have multiple outputs to drive multiple electro-optic segments at the same time. The IC 116 may be mounted on the visible portion 71a (as illustrated) or the concealed portion 71b. The IC 116 may include up to or at least 2000 digital-to-analog outputs for controlling a multitude of electro-optic elements 42 to monitor/control a multitude of points along a single electro-optic element 42. For example, the IC 116 may include a plurality of select nodes 119, with each select node 119 associated with one electro-optic element 42. In this way, the IC 116 may control hundreds or thousands of electro-optic elements 42 (or, as discussed in reference to FIG. 9, hundreds or thousands of electro-optic segments). One output (e.g., the select signal) may control a single multiplexer 118 capable of controlling the plurality of control transistors 110, 112, 114. It is generally contemplated that one or more of the functions of the multiplexer 118 may be integrated into the IC 116. Alternatively, the features of one or both of the IC 116 and the multiplexer 118 may be integrated with the controller 73, such that the controller 73 may directly control the switching circuitry 32 without the need for additional components. The IC 116 may include one or more shift registers to allow the IC 116 to cycle between control of outputs of the IC 116.

Referring more particularly to the control circuitry 70 depicted in FIG. 4, the first control transistor 110 may interpose the first feedback node 104 and the first electrode 22. This arrangement may allow selective connection of the first feedback node 104 with the second electrode 26. The second control transistor 112 may interpose the second feedback node 106 and the intermediate electrode 30 for selectively connecting the second feedback node 106 with the intermediate electrode 30. The third control transistor 114 may interpose the first and second driving nodes 108, 109 for controlling the first switching circuit 76 to electrically connect the second electrode 26 with the third electrode 30. The first and second control transistors 110, 112 may be operable to transfer analog signals between the controller 73 and the first electrode 22, and between the controller 73 and the intermediate electrode 30, respectively. Further, the third control transistor 114 may be operable to transfer a digital signal between the controller 73 and the first switching circuit 76.

One example by which the control circuitry 70 controls a clearing or darkening of the electro-optic element 42 is via activating or deactivating the driving transistor 120 of the switching circuitry 32. As illustrated, the driving transistor 120 may interpose the first electrode 22 and the intermediate electrode 30. The driving transistor 120 may operate as a switch that, when opened (e.g., the driving transistor 120 being deactivated), precludes electrical current from flowing between the first electrode 22 and the intermediate electrode 30. When the switch is closed (e.g., the driving transistor 120 is activated), electrical current may flow between the first electrode 22 and the intermediate electrode 30 to darken the electro-optic element 42. The electro-optic element 42 may clear when electrical current is precluded from flowing through the electro-optic medium 28. The electro-optic element 42 may darken when electrical current flows through the electro-optic medium 28.

Referring now to particular aspects of the driving transistor 120, the driving transistor 120 may have a first leg 122, a second leg 124, and a third leg 126. The third leg 126 may be operable to control electrical current between the first leg 122 and the second leg 124. The first leg 122 may be electrically connected with the first electrode 22, and the second leg 124 may be electrically connected with the intermediate electrode 30. The driving transistor 120 may be a field-effect transistor (FET) having a source terminal corresponding to the first leg 122, a drain terminal corresponding to the second leg 124, and a gate terminal corresponding to the third leg 126. The FET may be a Junction Field Effect Transistor (JFET), an Organic Field Effect Transistor (OFET), or a Metal Oxide Semiconductor Field Effect Transistor (MOSFET) and may be controlled depending on the voltage across the drain and the source terminals. Alternatively, the driving transistor 120 may be an insulated-gate bipolar transistor (IGBT). The driving transistor 120 may be a bipolar-junction transistor (BJT) having a collector terminal corresponding to the first leg 122, an emitter terminal corresponding to the second leg 124, and a base terminal corresponding to the third leg 126. The BJT may be an NPN transistor or a PNP transistor and may be controlled depending on the voltage across the base terminal and the emitter terminal. It is generally contemplated that the operation of the driving transistor 120 may be described with respect to an electrical current flowing through and/or a voltage corresponding to the third leg 126, and that reference to either type of transistor as "current-controlled" or "voltage-controlled" is merely descriptive and is non-limiting.

Figure 5:
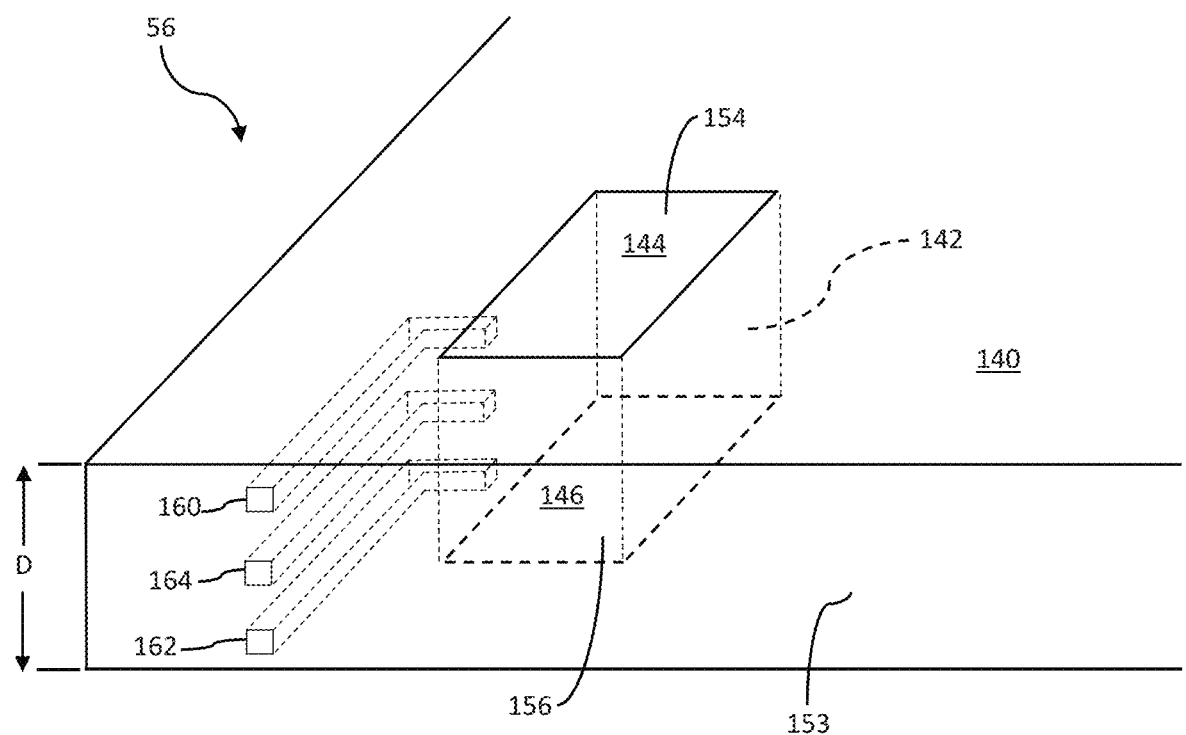
FIG. 5 is a partial perspective cross-sectional view of a switching layer of the electro-optic device of FIG. 2.

In some embodiments, the driving transistor 120 and/or the plurality of control transistors 110, 112, 114 are thin-film transistors (TFTs) disposed in the visible portion 71a. For example, the switching layer 56 may include the driving transistor 120 and/or the plurality of control transistors 110, 112, 114. The transistors 110, 112, 114, 120 may be substantially transparent and/or may comprise visible metal tracings interconnecting with the intermediate electrode 30 (FIG. 5). In some embodiments, the metal tracings are visibly undetectable from a distance (e.g., 15-50 cm) away from the electro-optic device 10. Accordingly, one or more of the transistors 110, 112, 114, 120 may be provided on the visible portion 71a.

With continued reference to FIG. 4, the third leg 126 of the driving transistor 120 may be in electrical communication with the third control transistor 114 via the second driving node 109. In this way, control of the driving transistor 120 may derive from the controller 73. In operation, the controller 73 may communicate a first digital signal via a first output node 130. The first digital signal may be converted to a voltage or current via the second DAC 102. The controller 73 may further be operable to communicate a second digital signal to the IC 116 via a second output node 132. The second digital signal may cause the IC 116 to output a select signal to the multiplexer 118 via the select node 119. The select signal may cause the multiplexer 118 to output a control signal to the third control transistor 114 via the control nodes 136. The control signal may be an analog signal operable to control the third control transistor 114 to generate a voltage at the third leg 126 of the driving transistor 120 and/or allow current to flow from the second DAC 102, through the first and second driving nodes 108, 109, to the third leg 126 of the driving transistor 120. In this way, the controller 73 may be operable to control the driving transistor 120 to apply a current or voltage to the electro-optic element 42.

The voltage/current at the third leg 126 of the driving transistor 120 may cause the driving transistor 120 to allow current to flow from the first leg 122 (corresponding to the second electrode 26) to the second leg 124 (corresponding to the intermediate electrode 30). The first and second control transistors 110, 112 may operate similarly to the third control transistor 114. For example, the first control transistor 110 may operate to provide voltage and/or current measurement data to the controller 73 corresponding to the first electrode 22. The second control transistor 112 may operate to provide voltage and/or current measurement data to the controller 73 corresponding to the intermediate electrode 30. The measurement data may be a result of processing analog signals via the first and second ADCs 96, 98. According to some embodiments, the controller 73 may have direct control of the driving transistor 120. For example, the second DAC 102 may be operable as a simple source driver for the driving transistor 120 such that the third control transistor 114 is omitted. It is generally contemplated that both a gate driver IC 116 and a source driver IC 116 may be employed simultaneously. Either or both of the gate and source driver IC 116 may be a display driver integrated circuit (DDIC).

To maintain, or hold, the target voltage or a target current for the electro-optic element 42, a capacitor 138 may be provided with the electro-optic device 10. For example, after the electro-optic element 42 or a plurality of electro-optic segments is scanned and reference voltages are monitored/measured by the control circuitry 70, the capacitor 138 may provide a sample-and-hold function. In one example, the capacitor 138 stores an analog voltage during a scan of voltages across multiple electro-optic segments and/or while the controller 73 processes voltage data to control the DAC 102. The capacitor 138 may interpose the second electrode 26 and the second driving node 109 to control a voltage across and/or current between the first electrode 22 and the second driving node 109. For example, the capacitor 138 may charge and/or discharge current based on a voltage difference between the second driving node 109 and the first electrode 22. In operation, the capacitor 138 may hold a voltage of the gate terminal (i.e., the third leg 126) of the driving transistor 120 while the multiplexer 118 cycles through control of the control nodes 136. Stated differently, the capacitor 138 may allow the driving transistor 120 to remain activated after an analog signal of the second driving node 109 is removed by discharging its electrical energy once an electrical potential is removed from the capacitor 138.

Still referring to FIG. 4, the driving transistor 120 may be activated/deactivated at a particular frequency at an average activation time, thereby resulting in an average current or voltage to the third leg 126 at a particular rate. The controller 73, or another portion of the control circuitry 70, may be operable to apply pulse-width modulation (PWM) to the third leg 126 of the driving transistor 120. For example, the multiplexer 118 may be operable to pulse the third control transistor 114 on/off at a particular rate while the first driving node 108 maintains a constant signal/voltage. In this way, the driving transistor 120 may be selectively activated at a frequency that matches or otherwise corresponds to the frequency at which the third control transistor 114 is activated. The first node 74 may provide a relatively high voltage (e.g., between 0.8V and 6V), such that a duty cycle of the driving transistor 120 is operable to control a voltage applied to the intermediate electrode 30 of between 0V and 6V. For example, a 50 percent duty cycle may result in a voltage of 3V provided through the driving transistor 120. Due to the resistance of the electrodes (e.g., ITO of the backplane (resistors 92, 94)), however, a drop in voltage may result in the same duty cycle (i.e., 50%) producing a voltage lower than 3V.

In some examples, the driving transistor 120 may be controlled to achieve a voltage drop across the electro-optic element 42 of between 0.2 and 0.8V. In order to achieve this voltage drop, the resistances of the first and second electrodes 22, 26 may be monitored or otherwise factored into a previously-programmed algorithm of the controller 73. For example, because there may be some loss of power along the ITO backplanes (e.g., the first and second electrodes 22, 26), the rate at which the driving transistor 120 is activated may be different depending on environmental conditions, such as heat, sunlight, and/or activation of one or more other circuits of the electro-optic device 10. The update rate of the control circuitry 70, or the frequency at which the controller 73 receives data and generates outputs, may be 10 Hz in some examples. The individualized control of the electro-optic element 42 may allow the electro-optic element 42 to not exceed a threshold voltage drop (e.g., 1.2V or 1.4V). The driving transistor 120 may employ amorphous silicon in order to limit leakage of the driving transistor 120 when light passes through the electro-optic device 10.

Due to the resistive nature of the ITO coating, electrical potential corresponding to the electrodes (e.g., the first, second, and intermediate electrodes 22, 26, 30) may decrease as the size of the electro-optic device 10 (e.g., length L, thickness, width, etc.) increases and/or the distance from the power supply circuitry 24 for the electro-optic device 10 increases. In general, a voltage drop across a distance from the power source may be approximated by half of a product of (i) a square of a distance from the electrical connector 48 (e.g., the busbar), (ii) a resistance value of the ITO coating per unit distance, and (iii) a loss of electrical current per area of the electro-optic element 42. Due to the exponential relationship of voltage drop to the distance from the bus bar (e.g., the length L), increasing the distance by a factor (e.g., 2) results in a voltage drop of a square of that factor (e.g., 4). Thus, monitoring the voltage at several points along the electrodes (e.g., the first, second, and intermediate electrodes 22, 26, 30) may allow the controller 73 to individually control each driving transistor 120 of the electro-optic element 42.

Figure 15:
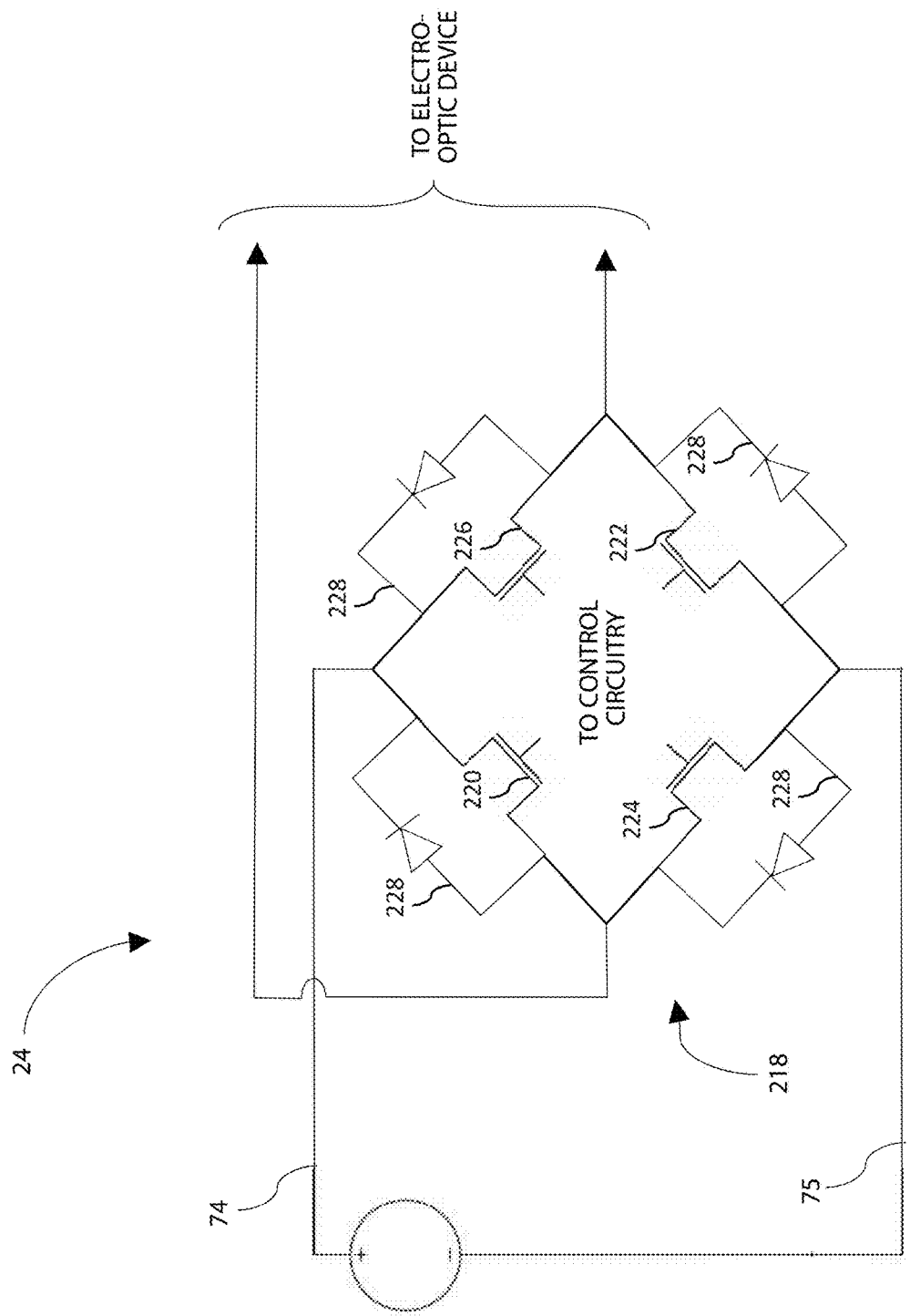
FIG. 15 is a schematic view of power supply circuitry for an electro-optic device according to one aspect of the present disclosure.

In various examples, the controller 73 may be operable to carry out various methods of controlling current through the electro-optic element 42. The controller 73 may be operable to receive electrical feedback (e.g., voltage, current, etc.) corresponding to one or more of the first electrode 22, the second electrode 26, and the intermediate electrode 30. The controller 73 may be operable to control the switching circuitry 32 via the integrated circuit 116 and/or other control circuitry 70 based on the electrical information/feedback. In particular, the controller 73 may be operable to control the driving transistor 120 to pass current through the driving transistor 120 to activate the electro-optic element 42. The controller 73 may further be operable to control the power supply circuitry 24 based on the electrical information. By way of example, the controller 73 may control the power supply circuitry 24 to invert a polarity of the power supply circuitry 24 to cause an electrical current to flow from the second electrode 26 to the first electrode 22. One example of a power inverter circuit described further herein is illustrated in FIG. 15. Additionally, or alternatively, the controller 73 may control the power supply circuitry 24 to reduce an output voltage of the power supply circuitry 24.

Controlling current through the electro-optic element 42 may be a closed-loop operation due, in part, to the feedback nodes 104, 106. By monitoring the voltages and/or currents at various points within the electro-optic device 10, control of the switching circuitry 32 (e.g., the driving transistor 120) may be tailored to achieve desired characteristics of an electro-optic cell (e.g., electro-optic element 42). In examples incorporating the at least one temperature sensor, a temperature gradient of the electro-optic device 10 may be monitored by the control circuitry 70 to allow further individualized control of the electro-optic element 42 or multiple electro-optic segments. In some examples, by employing a voltage across the electro-optic element 42 to be within the range of approximately 0.2 volts and 0.8 volts, the transparency of the electro-optic medium 28 may be controlled. Continuing with this example, generating a 0.8 volt signal may cause the electrochromic fluid in the electro-optic medium 28 to darken, and a 0.2 volt signal may cause the electrochromic fluid in the electrochromic medium 28 to become clear. Due to the size and shape of the electrodes 22, 26, 30, as well as the location of where the voltage and/or current is applied, a gradient distribution of the electro-optic medium 28 may be provided. Further, as previously discussed, the thickness of the ITO may impact the resistance of the ITO and thus the voltage and/or current across the electro-optic element 42. According to some aspects, the thickness of the ITO may be approximately 1500 nm. In other configurations, the thickness of the ITO may be in the range of approximately 100 nm and approximately 250 nm thick.

Closed-loop voltage control may allow voltage variation across the ITO layers, thereby reducing sensitivity of the transistors to light and temperature variation. In other words, because changes of electrical properties (e.g., voltage) that result from light or temperature variation may be detected, power applied to the electro-optic element 42 may be controlled to not exceed a voltage or current capable of damaging the electro-optic element 42. In some examples, the driving transistor 120 may be deactivated for a period of time, and the feedback nodes 104, 106 may be monitored during the period of time. Because current may not flow through the electrodes (e.g., the first, and the intermediate electrodes 22, 30) while the voltage across the electro-optic element 42 is monitored (aside from discharge of the capacitor 138), accurate voltage measurements may be gathered.

Referring now to FIG. 5, one possible position for the driving transistor 120 is generally indicated at the void shown (e.g., cavity 142). The driving transistor 120 and/or various electrical components of the switching circuit may be disposed in an insulating substrate 140 of the switching layer 56. The insulating substrate 140 may define the cavity 142 for receiving the switching circuitry 32. The cavity 142 may have an open top 144 and/or an open bottom 146, thereby extending through a depth D of the insulating substrate 140. The open top 144 may expose the cavity 142 to the first electrode 22, such that an electrically conductive material may extend between the first electrode 22 and at least a portion of the cavity 142. Similarly, the open bottom 146 may extend between the intermediate electrode 30 and at least a portion of the cavity 142. In this way, the switching circuit (for example, the driving transistor 120) may be in electrical communication with the second electrode 26 and the intermediate electrode 30. More specifically, the driving transistor 120 may be positioned adjacent the open top 144, and the second leg 124 of the driving transistor 120 may be positioned adjacent the open bottom 146. The insulating substrate 140 may be formed of a substantially transparent material, such as silicon dioxide.

With continued reference to FIG. 5, the insulating substrate 140 may include a plurality of electrode traces 160, 162, 164 to electrically connect portions of the cavity 142 with one or more electrical devices spaced from the electro-optic element 42. For example, the electrode traces 160, 162, 164 may be part of the control circuitry 70 and connect with one or more of the IC 116, the controller 73, the multiplexer 118, the control transistors 110, 112, 114, etc. from an exterior surface 153 of the switching layer 56, such as an outer edge of the electro-optic device 10. The plurality of electrode traces 160, 162, 164 may be fully enclosed by the insulating substrate 140, as illustrated, or may be disposed on upper and/or lower surfaces 154, 156 of the switching layer 56 (e.g., in a notch extending into the insulating substrate 140). The plurality of electrode traces 160, 162, 164 may include a first electrode trace 160, a second electrode trace 162, and a third electrode trace 164, each extending along non-intersecting pathways.

In one embodiment, the first electrode trace 160 may interconnect the first control transistor 110 and the second electrode 26. The second electrode trace 162 may interconnect the second control transistor 112 and the intermediate electrode 30. The third electrode trace 164 interconnecting may interconnect the third control transistor 114 and the third leg 126 of the driving transistor 120. The plurality of electrode traces 160, 162, 164 may be formed of ITO or may be a metal wire or metal coating having a narrow thickness (e.g., between 0.1 mm and 5 mm), such that the electro-optic element 42 maintains substantial transparency. Although not illustrated in detail, the at least one temperature sensor may also be disposed in the insulating later 140 within the cavity 142 or a separate cavity. Additional electrode traces may be included in the electro-optic device 10 to allow electrical signals that carry voltage and/or current corresponding to temperature readings from the at least one temperature sensor to the control circuitry 70, for example, the at least one temperature sensor may be comprised of one or more TFT's to allow substantial transparency of the electro-optic device 10 while providing for individualized control based on a temperature gradient across the electro-optic device 10.

Figure 6:
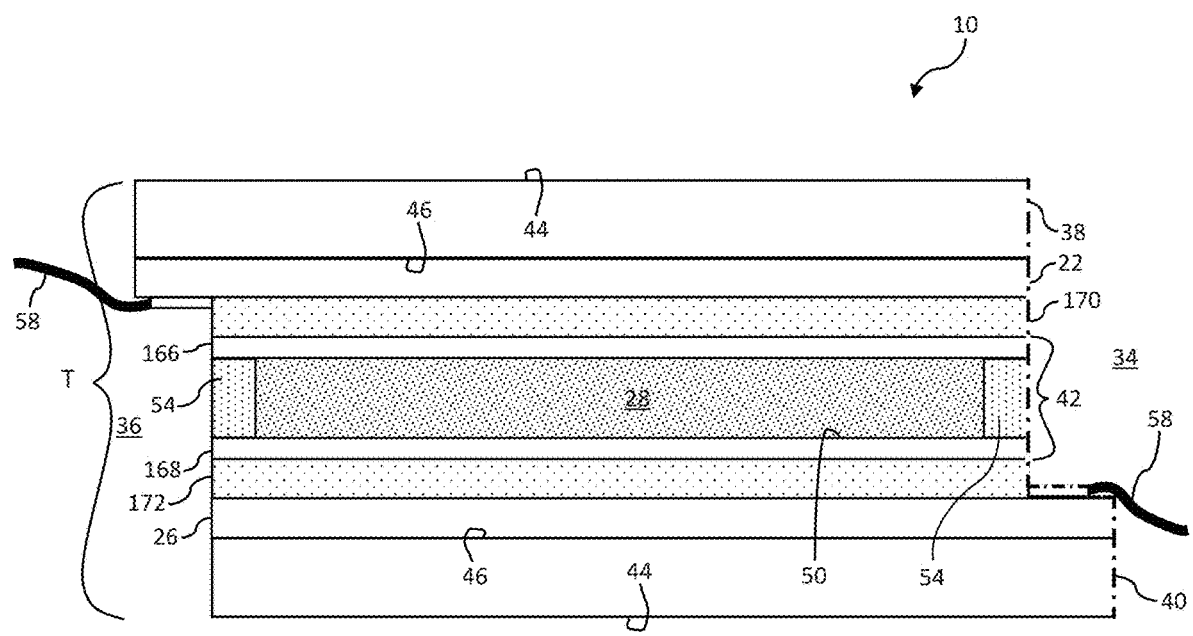
FIG. 6 is a cross-sectional view of the electro-optic device of FIG. 2 incorporating two switching layers.
Figure 7:
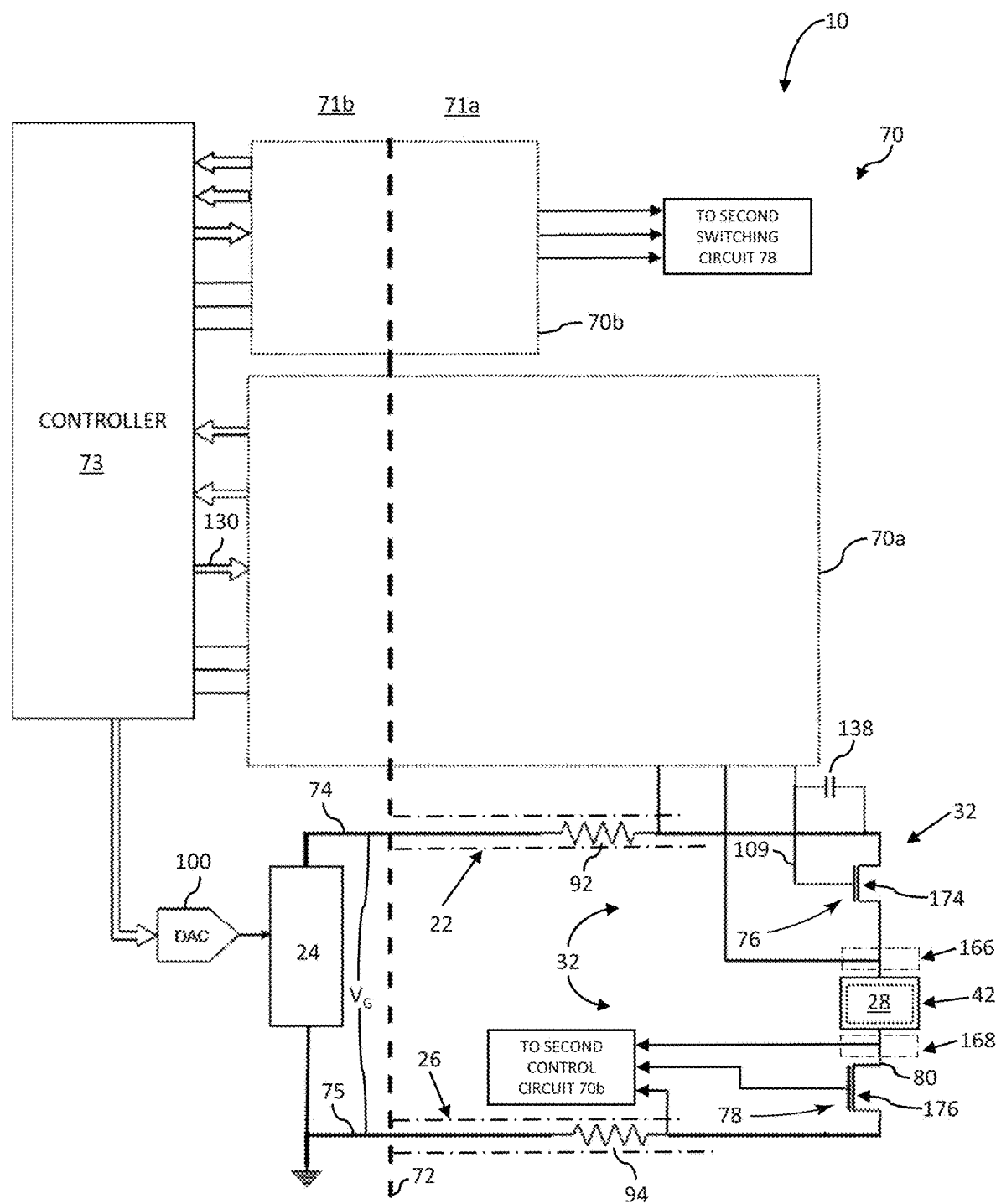
FIG. 7 is a schematic view of the electro-optic device of FIG. 6 in electrical communication with control circuitry.

Referring now to FIGS. 6 and 7, an electro-optic device 10 having two active plates is generally illustrated. The intermediate electrode 30 previously described may include a first intermediate electrode 166 and a second intermediate electrode 168. The electro-optic medium 28 may be disposed between the first and second intermediate electrodes 166, 168. In this configuration, the pair of intermediate electrodes 166, 168 and the electro-optic medium 28 form the electro-optic element 42, rather than one intermediate electrode 166, 168 and the first or the second electrode 22, 26 as demonstrated in reference to the preceding figures. As illustrated, the electro-optic device 10 may include a first switching layer 170 sandwiched between the first electrode 22 and the first intermediate electrode 166. A second switching layer 172 may be sandwiched between the second electrode 26 and the second intermediate electrode 168. Similar to the single switching layer 56, the first and second switching layers 170, 172 may include the features described as part of the switching layer 56 (i.e., the switching circuits 76, 78, the driving transistors 120, etc.).

As illustrated particularly in FIG. 7, the switching circuitry 32 may include a first driving transistor 174 and a second driving transistor 176. The first driving transistor 174 may be operable to control an electrical connection between the first electrode 22 and the first intermediate electrode 166. The second driving transistor 176 may be operable to control an electrical connection between the second electrode 26 and the second intermediate electrode 168. The first and second switching circuits 76, 78 may be controlled via the same control circuitry 70 or separate control circuits (i.e., first and second control circuits). The first and second control circuits are indicated generally at 70a and 70b in FIG. 7. Though demonstrated as separate components, the first and second control circuits 70a, 70b may be implemented as a single control device (e.g., IC 116 in FIG. 12). By way of example, each of the control circuits 70a, 70b may include a combination of the previously-described electrical components, such as an IC 116, the multiplexer 118, and control transistors 110, 112, 114. The first and second control circuits 70a, 70b may be independently controlled by the controller 73. In this way, the controller 73 may control the first control circuit 70a in a different way than the second control circuit 70b. For example, the second driving transistor 176 may be controlled to pulse at a lower rate or a higher rate than the first driving transistor 174, or vice versa.

Providing the second switching layer 172 may allow for finer control of electrical potential, and thus electrical current, across the electro-optic cell 42. Because the state of the electro-optic element 42 may depend on the relative voltage of the first intermediate electrode 166 and the second intermediate electrode 168, monitoring the voltage on either or both sides of the electro-optic element 42 may allow the controller 73 to provide more accurate responses. Further, inclusion of the second driving transistor 176 may provide even greater precision in achieving a desired current flow or voltage change.

Referring now to FIGS. 8-13, various embodiments of the electro-optic device 10 including a plurality of intermediate electrodes 178 forming a plurality of electro-optic segments 179 are illustrated. The plurality of electro-optic segments 179 may be arranged in an array 180 having rows 182 and columns 184. Both single-active plate (FIGS. 8 and 12) and dual-active plate (FIGS. 10 and 13) embodiments are illustrated employing the plurality of electro-optic segments 179. As described below, the electro-optic segments 179 may be referred to as individual electro-optic elements 42 or parts of a single electro-optic element 42. For example, the intermediate barriers 52 may be omitted and the electro-optic segments 179 may operate as portions of a single electro-optic element 42 that may have individually-controlled parts (as is illustrated in the figures). Alternatively, the intermediate barriers 52 may divide the electro-optic medium 28 into multiple parts, and an electro-optic segment 179 may be associated with each part. The intermediate barriers 52 may be spaced apart at a different distance than the space between the electro-optic segments 179. In this way, one electro-optic segment 179 may overlap (e.g., via overlapping of the electrodes 22, 26, 178) two or more isolated parts of the electro-optic medium 28.

Figure 8:
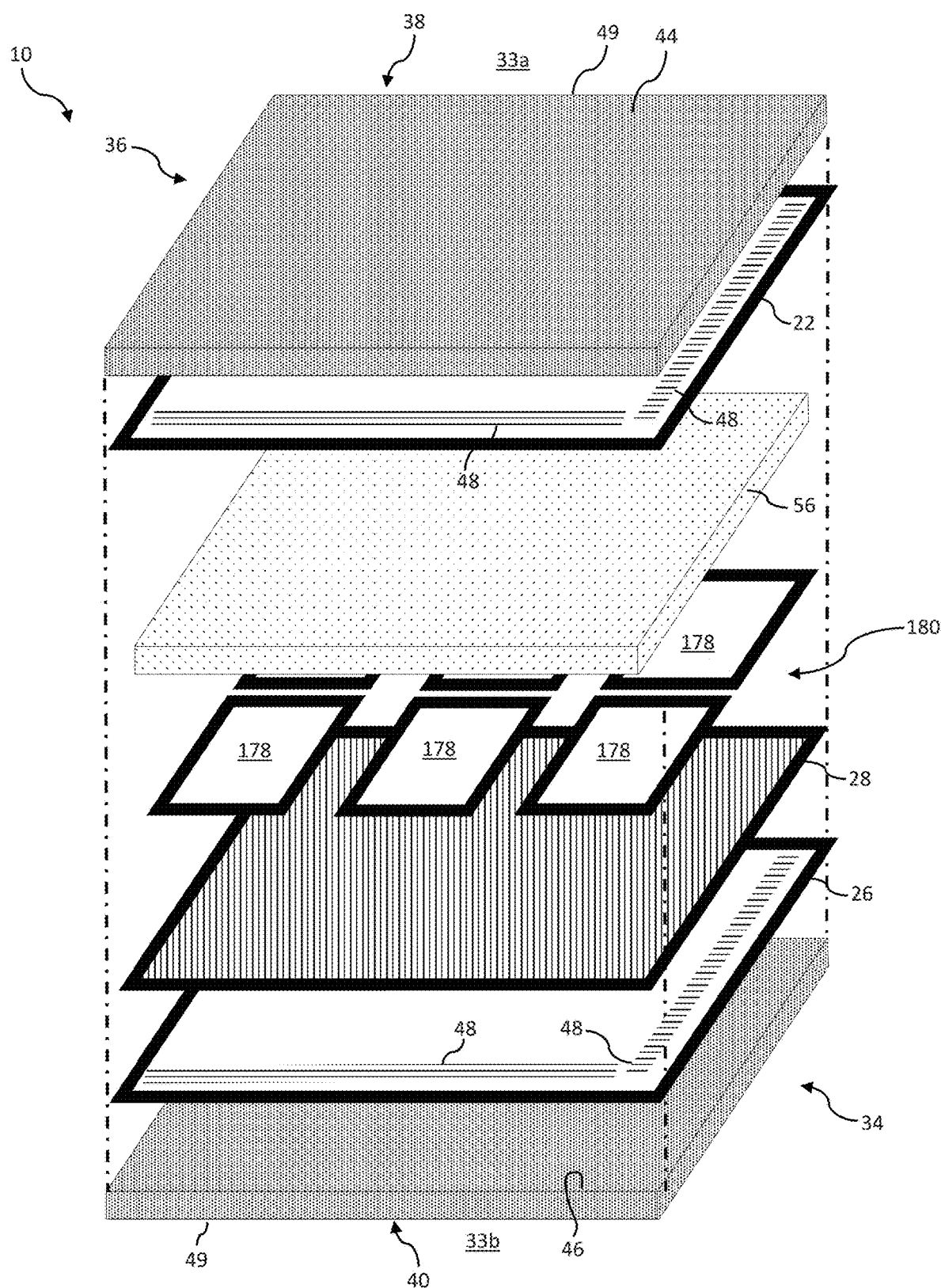
FIG. 8 is an exploded view of an electro-optic device according to one aspect of the present disclosure.
Figure 9:
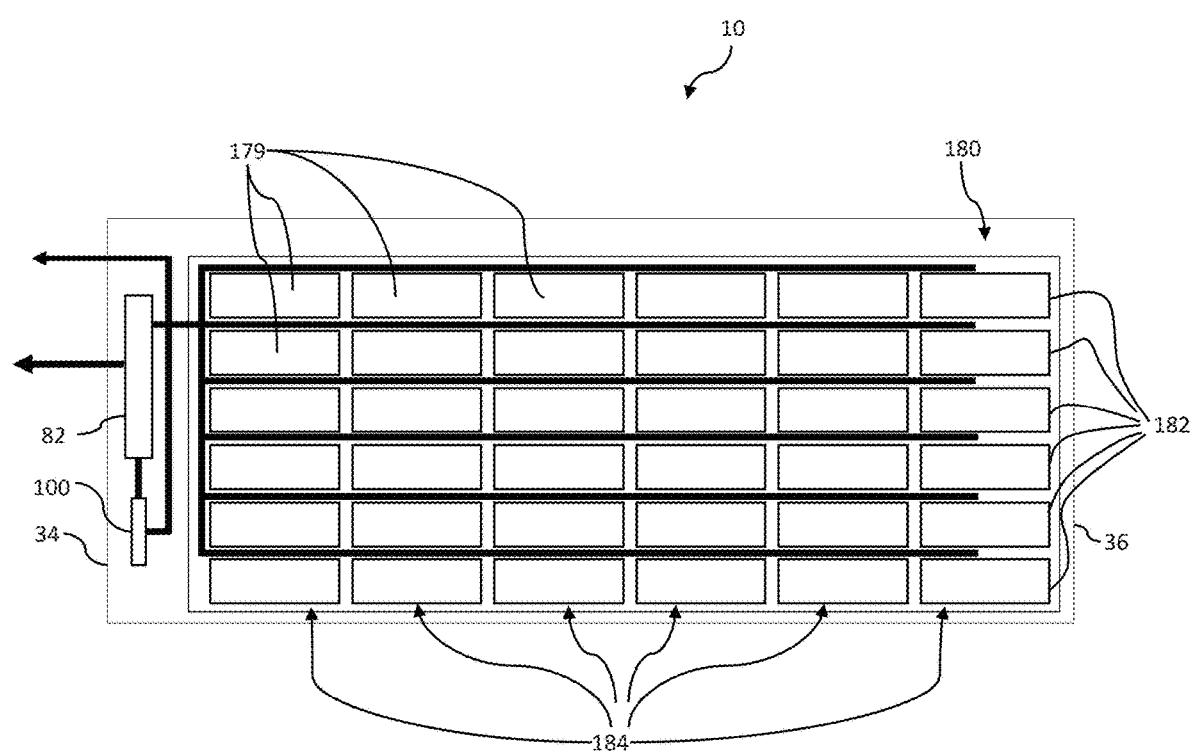
FIG. 9 is a top view of an electro-optic device incorporating an array of electro-optic segments.

As exemplarily illustrated in FIGS. 8 and 9, the array 180 may comprise a 6×6 grid of 36 electro-optic segments 179 and the same or different number of driving transistors 120. In this way, the desired transmissivity of individual portions of the electro-optic element 42 may be controlled in order to create a desired shape and/or gradient of the electro-optic device 10. For example, it is generally contemplated from the present disclosure that the electro-optic device 10 may include any number (e.g., tens, hundreds, millions, etc.) of electro-optic segments 179 in a single electro-optic device 10 as previously described. The optical resolution of a shape formed by the electro-optic segments 179 may be dependent on the number of segments in the electro-optic device 10. The resolution may also depend on the size and/or spacing between the electro-optic segments 179.

The size and shape of the electro-optic segments 179 may be uniform or non-uniform. For example, some electro-optic segments 179 may be elongated and/or shaped as a regular polygon (e.g., a hexagon, a square) while other electro-optic segments 179 may be shaped as an irregular polygon. In some cases, one or more of the electro-optic segments 179 may form a curvilinear-shaped insignia, logo, or the like. In this way, the electro-optic device 10 may be operable to display an insignia by controlling the electro-optic medium 28 to transmit light within the insignia and block light outside of the insignia, or vice versa. Due to the difference in size and/or shape of the electro-optic segments 179/ intermediate electrodes 166, 168 in combination with the individualized control of the driving transistors 120, a particular gradient or pattern may be formed in the electro-optic device 10.

Figure 10:
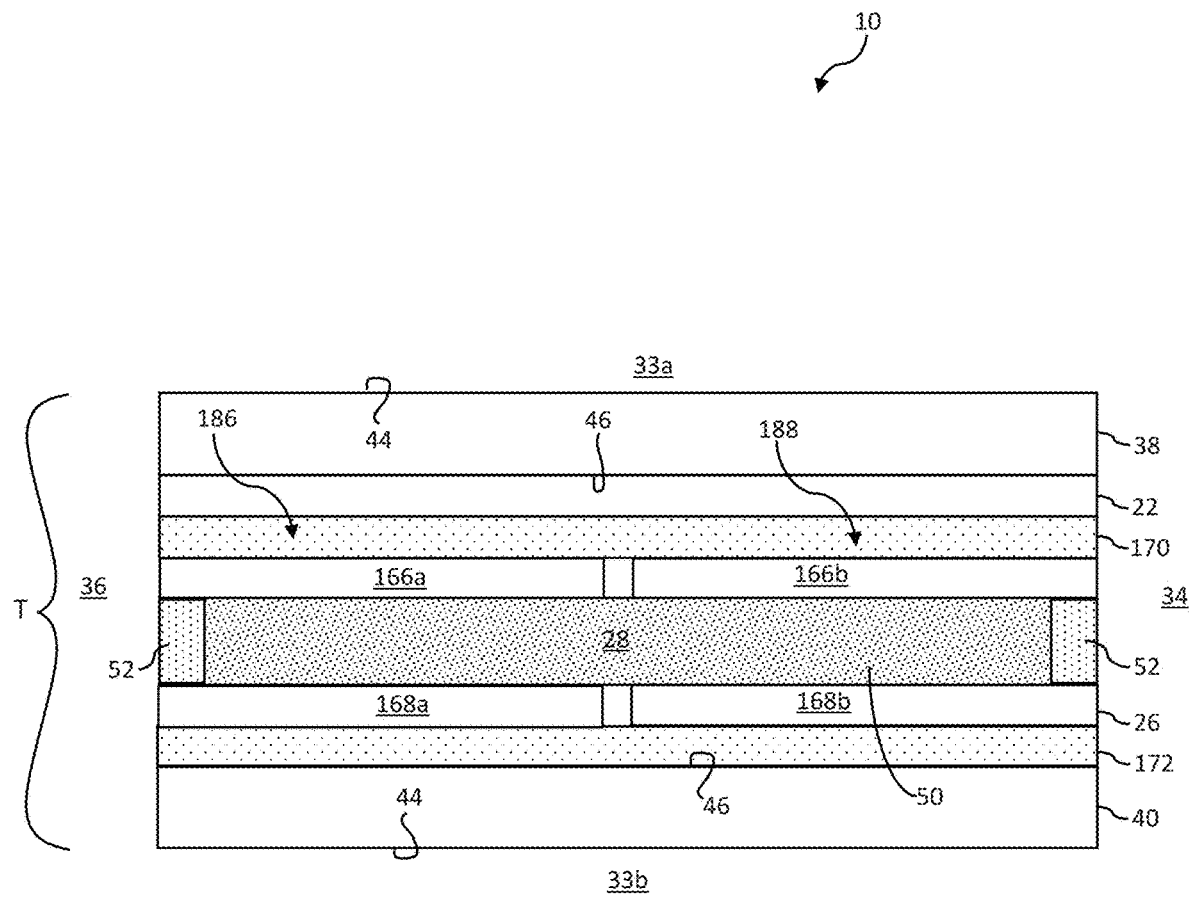
FIG. 10 is a partial cross-sectional view of the electro-optic device of FIG. 8.

Referring more particularly to FIGS. 9 and 10, portions of the control circuitry 70 may be positioned on one or both of the substrates 38, 40. For example, the power supply circuitry 24 and/or the control circuitry 70 (e.g., one or more of the converter modules 96, 98, 100, 102) may be positioned in the concealed portion 71b along the periphery of the electro-optic device 10. The power supply circuitry 24 and/or the control circuitry 70 may connect with the electro-optic segments 179 via sense and drive busses (generally illustrated by arrows in FIG. 9). The sense and drive busses may be provided via the electrode traces 160, 162, 164, as previously described. The electrode traces 160, 162, 164 may be formed in insulated portions of the switching layer 56 between the electro-optic segments 179. In this way, the electrode traces 160, 162, 164 may remain electrically isolated from all of the electro-optic segments 179 but a particular electro-optic segment 179 to be controlled/monitored via the control circuitry 70.

Referring to FIG. 10, a cross-sectional view of a portion of the electro-optic device 10 is illustrated showing a pair of side-by-side electro-optic segments 179 (e.g., a first electro-optic segment 186 and a second electro-optic segment 188). The first and second electro-optic segments 186, 188 may be spaced from one another. The optical transmissivity of the first electro-optic segment 186 and the second electro-optic segment 188 may be controlled individually to achieve a desired pattern or rate of clearing/darkening of the electro-optic device 10. It is generally contemplated that the first electro-optic segment 186 may be in parallel with the second electro-optic segment 188. Although a double active plate configuration is illustrated in the exemplary figure, it is generally contemplated that the electro-optic segments 186, 188 may be part of an electro-optic device 10 having a single active plate without departing from the present disclosure.

As similarly described with respect to the configuration having two intermediate electrodes 166, 168 in a single electro-optic element 42 (e.g., FIG. 6), the first switching layer 170 may be disposed between the first electrode 22 and the pair of first intermediate electrodes 166a, 166b. The first switching layer 170 may include the first switching circuit 76 for controlling the first electro-optic segment 186. The first switching layer 170 may also include a third switching circuit 190 (see FIGS. 12 and 13) for controlling the second electro-optic segment 188. Similarly, the second switching layer 172 may be disposed between the second electrode 26 and the pair of second intermediate electrodes 168a, 168b. The second switching layer 172 may include the second switching circuit 78 for controlling the first electro-optic segment 186. The second switching layer 172 may also include a fourth switching circuit 192 for controlling the second electro-optic segment 188. Each of the switching circuits 76, 78, 190, 192 may be controlled as a group or individually by employing a combination of various electrical components previously discussed (e.g., controller 73, control circuitry 70, multiplexers 118, control transistors 110, 112, 114, ICs 116, DAC's 100, 102, ADC's 96, 98, etc.). These switching circuits 76, 78, 190, 192 are generally illustrated in FIG. 13.

Referring back to FIGS. 8 and 9, the one or more electro-optic segments 179 may form the array 180 of electro-optic segments 179. The rows 182 and columns 184 are illustrated in a rectangular grid-like configuration, though any shape and/or arrangement of the array 180 may be formed. For example, the array 180 may be arranged linearly having only one dimension (e.g., a single row). Alternatively, the array 180 may be irregular and/or form a grid that corresponds to an insignia. The array 180 depicted in the figures is a non-limiting arrangement of the array 180.

Control of an electro-optic segment 179 may impact the control of adjacent electro-optic segments 179. For example, as a voltage associated with a first segment 186 is adjusted, the voltage supplied to surrounding segments (e.g., the second segment 188) may be changed as well. Thus, an oscillating feedback loop may be achieved, as the controller 73 may be operable to sample discrete time feedback signals associated with voltages of the electro-optic segments 186, 188. Stated differently, control of the driving transistors 174, 176 may cause changes in voltages of neighboring electro-optic segments 179 due to the common connection with the first and second electrodes 22, 26, and the controller 73 may utilize this response to maximize uniformity.

Figure 11:
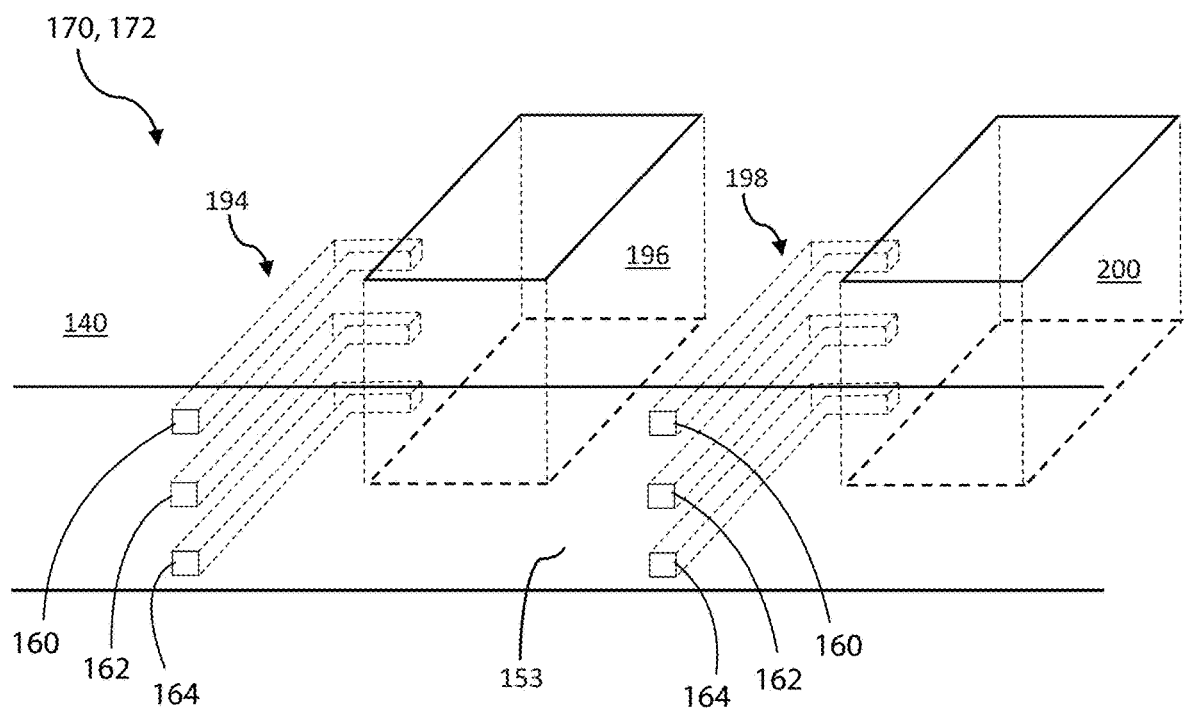
FIG. 11 is a partial perspective cross-sectional view of a switching layer of an electro-optic device of FIG. 8.

As previously described with respect to a single switching layer 56, switching layers 170, 172 may include the plurality of electrode traces 160, 162, 164 and define a cavity 142 associated with each switching circuit 76, 78, as shown in FIG. 11. Thus, each switching layer 170, 172 may include a first set of electrode traces 194 and a first cavity 196 corresponding to the first electro-optic segment 186. Each switching layer 170, 172 may also define a second set of electrode traces 198 and a second cavity 200 corresponding to the second electro-optic segment 188. It is generally contemplated that each set of electrode traces may include additional electrode traces to allow for dual active-plate control and/or monitoring or temperature monitoring. The first switching circuit 76 and the third switching circuit 190 may be disposed in the first cavity 196 and the second cavity 200 of the first switching layer 170, respectively. The second switching circuit 78 and the fourth switching circuit 192 may be disposed in the first cavity 196 and the second cavity 200 of the second switching layer 172, respectively.

Figure 12:
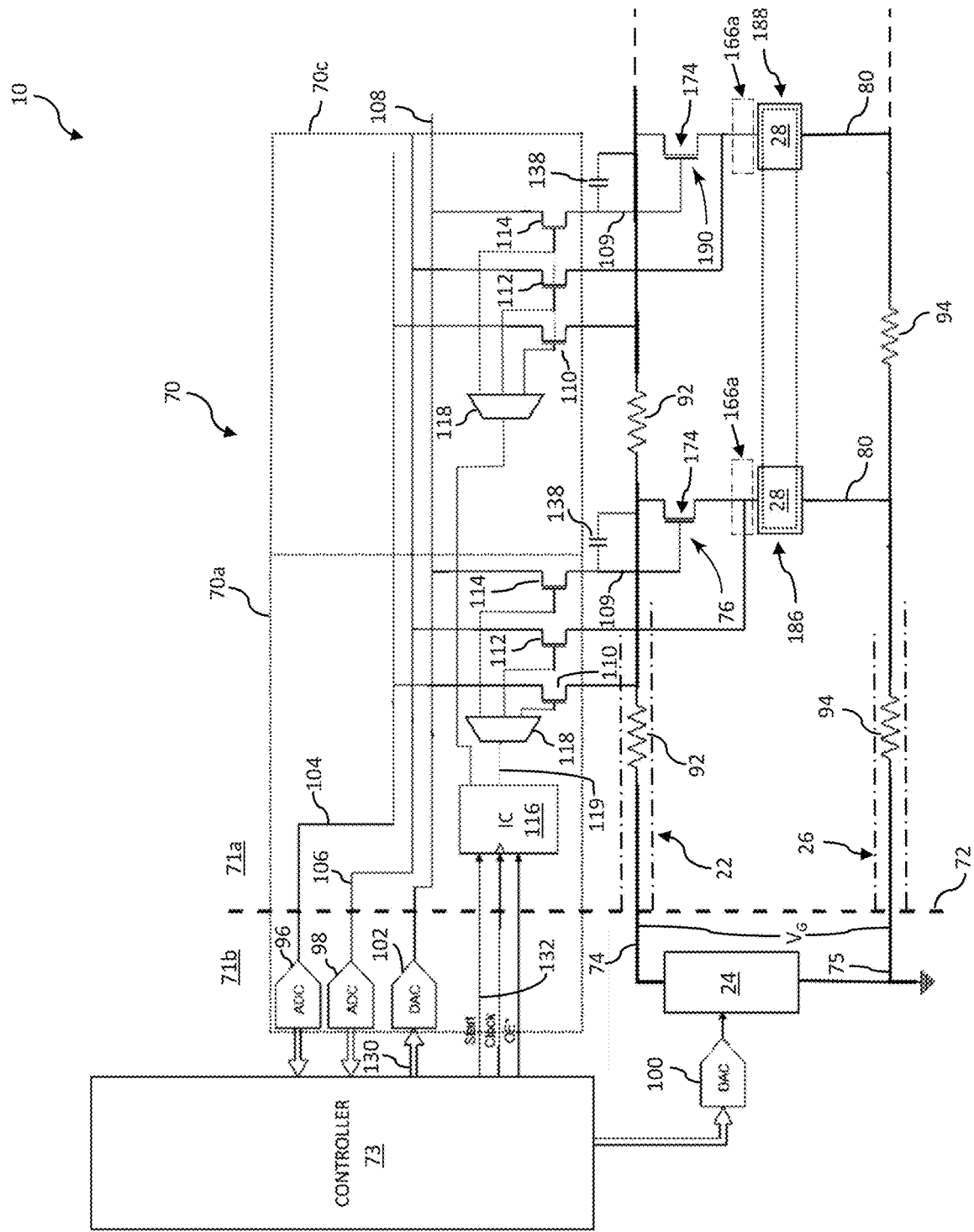
FIG. 12 is a schematic view of an electro-optic device in electrical communication with control circuitry.
Figure 13:
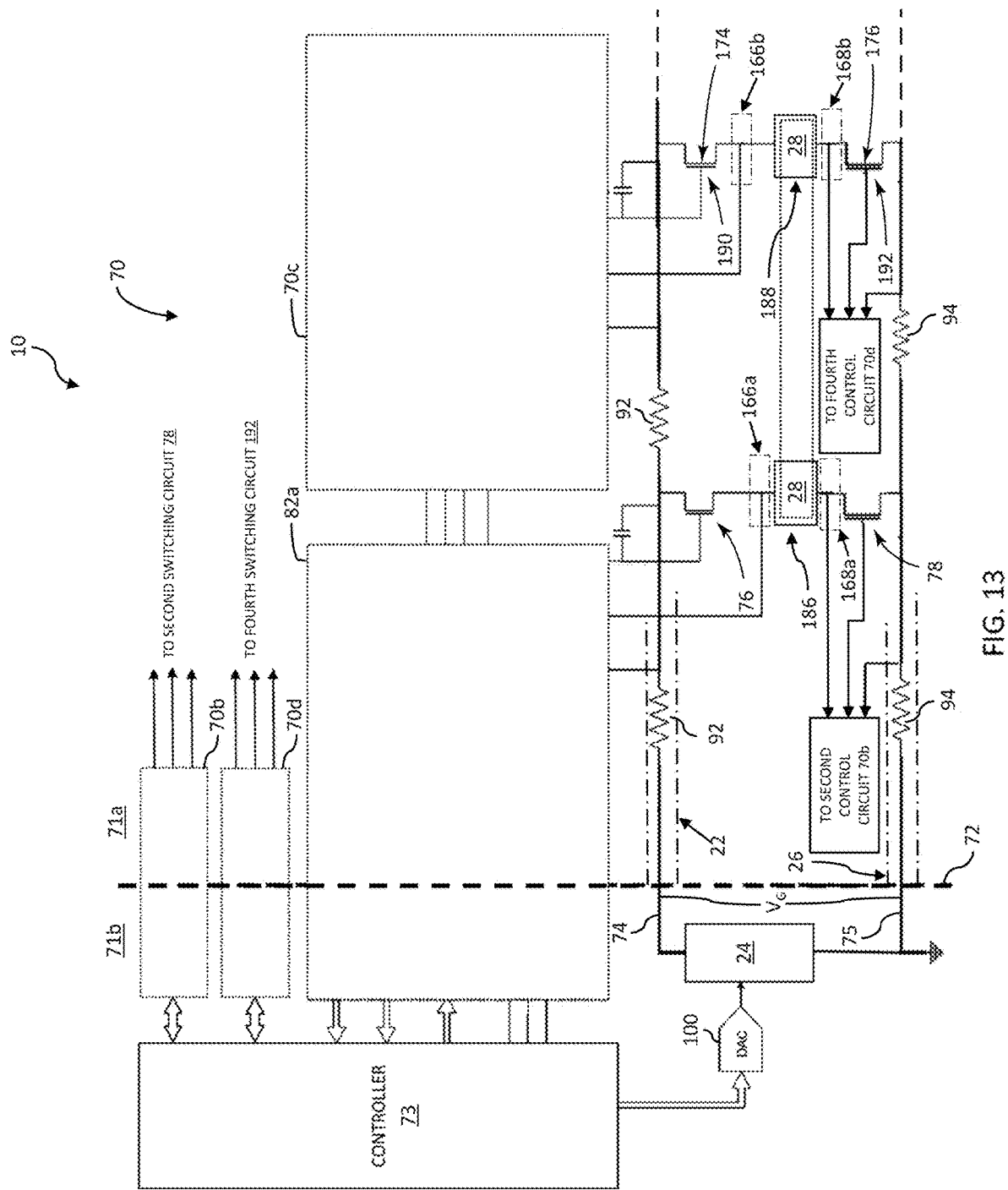
FIG. 13 is a schematic view of the electro-optic device of FIG. 10 in electrical communication with control circuitry.

Referring now to FIGS. 12 and 13, configurations of the electro-optic device 10 having first and second electro-optic segments 186, 188 are illustrated. It is generally contemplated that any number of electro-optic segments 179 may be disposed in parallel with the electro-optic segments 186, 188, as indicated by the continuing of the first electrode 22 and the nodes past the second electro-optic segment 188. With reference to FIG. 12, the electro-optic device 10 is demonstrated with a single active plate, whereas FIG. 13 illustrates an electro-optic device 10 having two active plates. As illustrated in the figures, a third control circuit 70c may be provided to control the third switching circuit 190. As illustrated in FIG. 13, a fourth control circuit 70d may be provided to control the fourth switching circuit 192. It is generally contemplated that each control circuit 70a, 70b, 70c, 70d may be controlled by a single IC 116 via a select node for each control circuit. The configurations illustrated in FIGS. 12 and 13 demonstrate the scalability of electro-optic segments 179 in the electro-optic device 10. It is generally contemplated that a hybrid electro-optic device 10 having part dual and part single active plate configurations may be configured according to aspects of the present disclosure. Stated differently, in some configurations, the electro-optic device 10 includes two active plates associated with the first electro-optic segment 186 and one active plate associated with the second electro-optic segment 186.

In operation, the IC 116 may be employed to adjust the current into each segment, then the control loop may monitor the voltage and control the driving transistors 174, 176 to a desired set point. In this way, the second DAC 102 may continuously and directly drive each electro-optic segment 179. In a 0.5 m×1.0 m window assembly (e.g., a sunroof window), up to 1,000 electro-optic segments may be provided, each having a footprint of 1 square millimeter. Thus, resistance of the ITO backplanes may significantly impact the voltage/current of each segment over the length L or width W of the electro-optic device 10. Therefore, the controller 73 may be configured to incorporate voltage and current feedback/control to safely and uniformly control the electro-optic segments 179.

Figure 14:
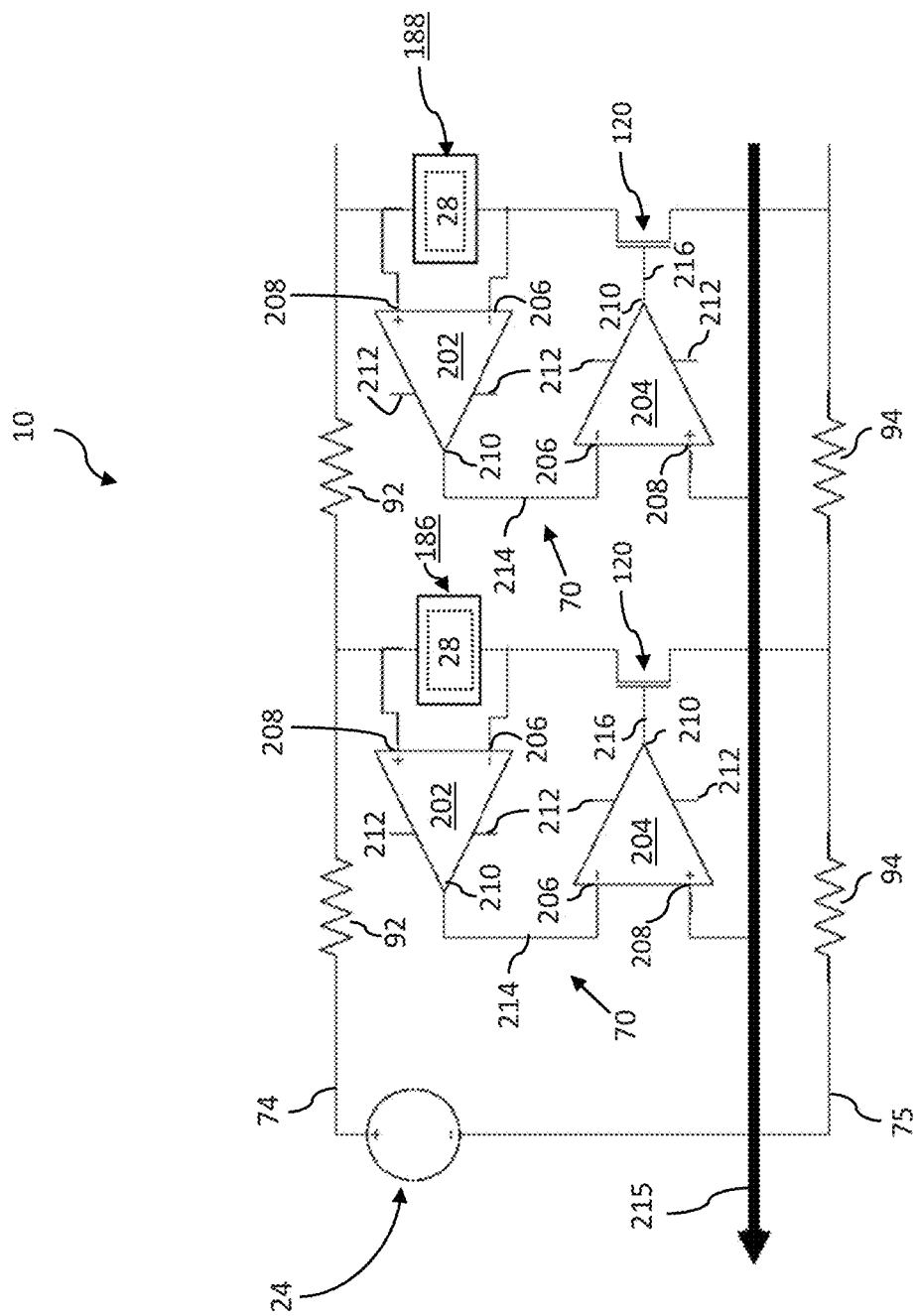
FIG. 14 is a schematic view of the electro-optic device in electrical communication with analog components of control circuitry.

Referring to FIG. 14, one configuration of the electro-optic element 42 includes at least one operational amplifier 202, 204 operable to control one or more of the driving transistors 120. For example, each switching circuit (e.g., second and fourth switching circuits 78, 192) may include a first operational amplifier (op amp 202) in electrical communication with a second operational amplifier 204 downstream of the first op amp 202. Each op amp 202, 204 may include an inverting input terminal 206, a non-inverting input terminal 208, and an output terminal 210 that controls an output signal based on a voltage difference between the inverting input terminal 206 and the non-inverting input terminal 208. Further, each op amp 202, 204 may include two power inputs 212 to allow each op amp 202, 204 to amplify a signal supplied to the op amp. The first op amp 202 may be operable to receive a voltage difference of the first electrode 22 and the intermediate electrode 30. The second op amp 204 may be operable to receive a voltage difference of a first output 214 of the first op amp 202 and a voltage of a control signal node 215. The control signal node 215 may correspond to the first driving node 108 of the previous embodiments. A second output 216 of the second op amp 204 may be in electrical communication with the third leg 126 of the driving transistor 120.

In operation, a voltage of the control signal node 215 may effectively control the voltage across the electro-optic segments 186, 188. For example, the power supply circuitry 24 may output a high global voltage VG (e.g., 6V). The polarity of the global voltage VG may be reversed to enable faster clearing of the electro-optic device 10. Alternatively, a 4-transistor H-bridge 218 may be used to drive each individual electro-optic segment 186, 188 in either polarity (FIG. 15). For example, one H-bridge 218 may be associated with each of the pair of electro-optic segments 186, 188, and/or one H-bridge 218 may be employed to control the polarity of the global voltage VG, as illustrated. It is contemplated that the controller 73 may be configured to activate individually-controlled transistors (e.g., first transistors 220, 222) of the H-bridge 218 to provide a non-inverted power signal to the electro-optic device 10 (e.g., individual electro-optic segments 179) when second transistors 224, 226 of the H-bridge 218 are deactivated. Similarly, the controller 73 may be configured to activate the second transistors 224, 226 of the H-bridge 218 to provide an inverted power signal to the electro-optic device 10 when the first transistors 220, 222 are deactivated. A voltage protection circuit 228, such as the parallel diode circuit illustrated, may be incorporated with each of the transistors 220, 222, 224, 226 to prevent electrical shorts in the H-bridge 218 and/or the power supply. It is contemplated that the 4-transistor H-bridge 218 may be incorporated with any of the previously described configurations.

One electrode of each electro-optic segment 186, 188 may be connected to the first node 74 of the power supply circuitry 24. The voltage of the control signal node 215 may be proportional to a difference between the global voltage VG and a target voltage across the electro-optic segments 186, 188. The second op amp 204 may then output a signal based on a difference between the target voltage of the control signal node 215 and the output voltage of the first op amp 202. Since the output voltage of the first op amp 202 may be proportional to a voltage across the electro-optic segments 186, 188, control of the global voltage VG may result in self-regulation (e.g., pre-configured voltage regulation of the electro-optic segments 179). Stated differently, according to some embodiments, the controller 73 may not require direct feedback to achieve adequate voltage control of the electro-optic element 42. In some configurations, the controller 73 may be omitted and the reference voltage provided by the control signal node 215 may be provided directly by the power supply circuitry 24.

The electro-optic element 42 and the first and second substrates 38, 40 may be formed of various materials. For example, the first and second substrates 38, 40 may include plastic materials. Plastic materials for the first and second substrates 38, 40 may include, but are not limited to, polycarbonates, polyethylene terephthalate (PET), polyesters, polyimides, polyamides, acrylics, cyclic olefins, polyethylenes (PE), like metallocene polyethylene (mPE), polyethylene naphthalate (PEN), silicones, urethanes, and various polymeric materials. The first and second substrates 38, 40 may also be of various forms of glass, including, but not limited to, soda lime float glass, borosilicate glass, boro-aluminosilicate glass, or various other compositions. When using glass substrates, the first and second substrates 38, 40 can be annealed, heat strengthened, chemically strengthened, partially tempered, or fully tempered. The electro-optic element 42 forming the panel (e.g., a window, viewing device, selective display device, etc.) may be supported by a frame, which may correspond to a partial or full frame that may be used to support a window panel as desired.

The first and second substrates 38, 40 as well as one or more protective layers, may be adhered together by one or more laminate materials. For example, the laminate material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as laminate materials to adhere to one or more of the first and second substrates 38, 40 and/or additional protective layers or coating.

According to various aspects, the electro-optic element 42 may include memory chemistry configured to retain a state of transmittance when the vehicle and the window control module are inactive (e.g., not actively supplied energy from a power supply of the vehicle). That is, the electro-optic element 42 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic element may correspond to an electrochromic device being configured to vary the transmittance of the window discussed herein in response to an applied voltage from the window. Examples of control circuits and related devices that may be configured to provide for electrodes and hardware configured to control the electro-optic element are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference.

Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609 entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which is incorporated herein by reference in its entirety. In other embodiments, the electro-optic device may include a suspended particle device, liquid crystal, or other system that changes transmittance with the application of an electrical property.

According to one aspect of the disclosure, an electro-optic device includes a first electrode electrically connecting with power supply circuitry. A second electrode is spaced from the first electrode and electrically connecting with the power supply circuitry. An electro-optic medium is disposed between the first electrode and the second electrode. At least one third electrode is disposed between the first electrode and the second electrode and electrically connecting with one of the first electrode and the second electrode via switching circuitry. The switching circuitry is operable to control an electrical current through the first electrode, the electro-optic medium, and the second electrode.

According to one aspect of the disclosure, further including control circuitry in communication with the switching circuitry for controlling the switching circuitry to control the electrical current through the first electrode, the electro-optic medium, and the second electrode.

According to one aspect of the disclosure, the control circuitry is in communication with the at least one third electrode and with one of the first electrode and the second electrode to determine a voltage drop across the electro-optic medium.

According to one aspect of the disclosure, the control circuitry is operable to control the switching circuitry based on the voltage drop across the electro-optic medium.

According to one aspect of the disclosure, the control circuitry is operable to control the power supply circuitry based on the voltage drop across the electro-optic medium.

According to one aspect of the disclosure, the switching circuitry includes a first switching circuit and a second switching circuit and the at least one third electrode includes a first intermediate electrode corresponding to the first switching circuit and a second intermediate electrode corresponding to the second switching circuit.

According to one aspect of the disclosure, the first switching circuit is disposed in a first switching layer interposing the first electrode and the first intermediate electrode and the second switching circuit is disposed in a second switching layer interposing the second electrode and the second intermediate electrode.

According to one aspect of the disclosure, one of the first switching layer and the second switching layer includes a first transistor operable to prevent the electrical current from flowing through the electro-optic medium.

According to one aspect of the disclosure, the first transistor is a thin-film transistor.

According to one aspect of the disclosure, the at least one third electrode includes a third intermediate electrode in parallel with the first intermediate electrode. The first switching circuit includes a second transistor operable to prevent the electrical current from flowing through the electro-optic medium.

According to one aspect of the disclosure, the control circuitry is in communication with the first intermediate electrode and the second intermediate electrode to determine a voltage drop across the electro-optic medium.

According to one aspect of the disclosure, an electro-optic device includes a first electrode electrically connecting with power supply circuitry. A second electrode is spaced from the first electrode and electrically connecting with the power supply circuitry. An electro-optic medium is disposed between the first electrode and the second electrode. At least one third electrode is disposed between the first electrode and the second electrode and electrically connecting with one of the first electrode and the second electrode via switching circuitry. Control circuitry in communication with the switching circuitry for controlling the switching circuitry to control an electrical current through the first electrode, the electro-optic medium, and the second electrode.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An electro-optic device comprising:
    a first electrode electrically connecting with a power supply circuit;
    a second electrode spaced from the first electrode and electrically connecting with the power supply circuit;
    an electro-optic medium disposed between the first electrode and the second electrode;
    at least one third electrode disposed between the first electrode and the second electrode; and
    a control circuit electrically connected to one of the first electrode and the second electrode wherein the control circuit:
        monitors a measured control signal of the at least one third electrode; and
        adjusts a driving control signal communicated to the one of the first electrode and the second electrode based on the measured control signal and updates a corresponding transmission state of the electro-optic device to a target transmittance.

2. The electro-optic device according to claim 1, wherein the control circuit further:
    compares the measured control signal to correspond to the target transmittance of the driving control signal and adjusts the driving control signal based on the comparison.

3. The electro-optic device according to claim 2, wherein the measured control signal is indicative of an electrical potential between the first electrode and the second electrode and the driving control signal adjusts the electro-optic element to the target transmittance by adjusting an electrical potential between the first electrode and the second electrode.

4. The electro-optic device according to claim 1, wherein the at least one third electrode is interposed between the electro-optic medium and the one of the first electrode and the second electrode and extends over at least a portion of a transmissive surface area through which light is selectively transmitted in response to the electrical signal.

5. The electro-optic device according to claim 1, wherein the control circuit comprises a switching circuit electrically connecting the at least one third electrode with the one of the first electrode and the second electrode.

6. The electro-optic device according to claim 5, wherein the switching circuit controls current conducted through the first electrode, the electro-optic medium, and the second electrode resulting from the driving control signal.

7. The electro-optic device according to claim 5, wherein the monitoring of the control signal comprises monitoring a voltage drop from the first electrode to the second electrode across the electro-optic medium.

8. The electro-optic device of claim 7, wherein the control circuit further:
    controls the switching circuit based on the voltage drop across the electro-optic medium.

9. The electro-optic device of claim 7, wherein the control circuit controls the driving control signal by controlling the power supply circuit based on the voltage drop across the electro-optic medium.

10. The electro-optic device of claim 5, wherein the switching circuit comprises:
    a first switching circuit and a second switching circuit, wherein the at least one third electrode includes a first intermediate electrode conductively connected to the first switching circuit and a second intermediate electrode conductively connected to the second switching circuit.

11. The electro-optic device of claim 10, wherein the first intermediate electrode is interposed between the first electrode and the electro-optic medium, and the second intermediate electrode is interposed between the second electrode and the electro-optic medium.

12. The electro-optic device of claim 11, wherein the first switching circuit is disposed in a first switching layer interposed between the first electrode and the first intermediate electrode and the second switching circuit is disposed in a second switching layer interposed between the second electrode and the second intermediate electrode.

13. The electro-optic device of claim 12, wherein one of the first switching layer and the second switching layer includes a first transistor operable to prevent the current from flowing through the electro-optic medium.

14. The electro-optic device of claim 13, wherein the at least one third electrode includes a third intermediate electrode in parallel with the first intermediate electrode, and wherein the first switching circuit includes a second transistor operable to suppress the current from flowing through the electro-optic medium.

15. The electro-optic device of claim 10, wherein the control circuit is in communication with the first intermediate electrode and the second intermediate electrode and identifies the measured control signal as a voltage drop across the electro-optic medium between the first intermediate electrode and the second intermediate electrode.

16. A method for controlling an electro-optic device comprising:
supplying a driving control signal to at least one of a first electrode and a second electrode of the electro-optic device;
conducting current across an electro-optic medium between the first electrode and the second electrode;
monitoring a measured control signal of at least one third electrode conductively connected to one of the first electrode and the second electrode; and
adjusting the driving control signal based on the measured control signal thereby updating a corresponding transmission state of the electro-optic device to a target transmittance.

17. The method according to claim 16, wherein the monitoring comprises comparing the measured control signal to correspond to the target transmittance of the driving control signal and the adjusting updates the driving control signal based on the comparison.

18. The method according to claim 16, further comprising:
adjusting the transmission state to the target transmittance by controlling a switching circuit electrically connecting the at least one third electrode with the one of the first electrode and the second electrode.

19. The electro-optic device according to claim 18, wherein the switching circuit controls the current conducted through the electro-optic medium from the one of the first electrode and the second electrode resulting from the driving control signal.

20. An electro-optic device comprising:
a first electrode electrically connecting with a power supply circuitry;
a second electrode spaced from the first electrode and electrically connecting with the power supply circuitry;
an electro-optic medium disposed between the first electrode and the second electrode;
at least one third electrode disposed between the first electrode and the second electrode and electrically connecting with one of the first electrode and the second electrode via a switching circuitry; and
control circuitry in communication with the switching circuitry that controls the switching circuitry to adjust an electrical current through the first electrode, the electro-optic medium, and the second electrode.

* * * * *